US007650446B2

(12) United States Patent
Nonaka et al.

(10) Patent No.: US 7,650,446 B2
(45) Date of Patent: Jan. 19, 2010

(54) STORAGE SYSTEM FOR BACK-END COMMUNICATIONS WITH OTHER STORAGE SYSTEM

(75) Inventors: Yusuke Nonaka, Sagamihara (JP); Akira Nishimoto, Sagamihara (JP); Azuma Kano, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 96 days.

(21) Appl. No.: 11/613,400

(22) Filed: Dec. 20, 2006

(65) Prior Publication Data

US 2008/0147934 A1 Jun. 19, 2008

(30) Foreign Application Priority Data

Oct. 12, 2006 (JP) ............................ 2006-278566

(51) Int. Cl.
*G06F 13/12* (2006.01)
*G06F 13/38* (2006.01)

(52) U.S. Cl. .......................................... 710/74; 710/72

(58) Field of Classification Search .................... 710/74
See application file for complete search history.

(56) References Cited

U.S. PATENT DOCUMENTS

| | | | | |
|---|---|---|---|---|
| 5,890,014 | A * | 3/1999 | Long | 710/8 |
| 7,149,859 | B2 * | 12/2006 | Fujibayashi | 711/162 |
| 7,171,524 | B2 | 1/2007 | Kobayashi | |
| 7,328,324 | B2 * | 2/2008 | Wang et al. | 711/173 |
| 2004/0049553 | A1 | 3/2004 | Iwamura et al. | |
| 2004/0236908 | A1 | 11/2004 | Suzuki et al. | |
| 2005/0210191 | A1 | 9/2005 | Kobayashi | |
| 2006/0062219 | A1 | 3/2006 | Ookubo | |

FOREIGN PATENT DOCUMENTS

| | | |
|---|---|---|
| JP | 2004-102374 | 4/2004 |
| JP | 2005-267111 | 9/2005 |
| JP | 2006-085521 | 3/2006 |
| JP | 2006-278237 | 10/2006 |

OTHER PUBLICATIONS

U.S. Appl. No. 11/702,495, filed Feb. 6, 2007, Tanaka et al.

* cited by examiner

*Primary Examiner*—Alford W Kindred
*Assistant Examiner*—Zachary K Huson
(74) *Attorney, Agent, or Firm*—Brundidge & Stanger, P.C.

(57) ABSTRACT

In a first and second storage system, first and second switching apparatuses are interposed between a first and second controller and a storage device. At least one of the first and second switching apparatuses comprises a shared memory. The constitution is such that the first and second controllers communicate with one another via this shared memory.

11 Claims, 20 Drawing Sheets

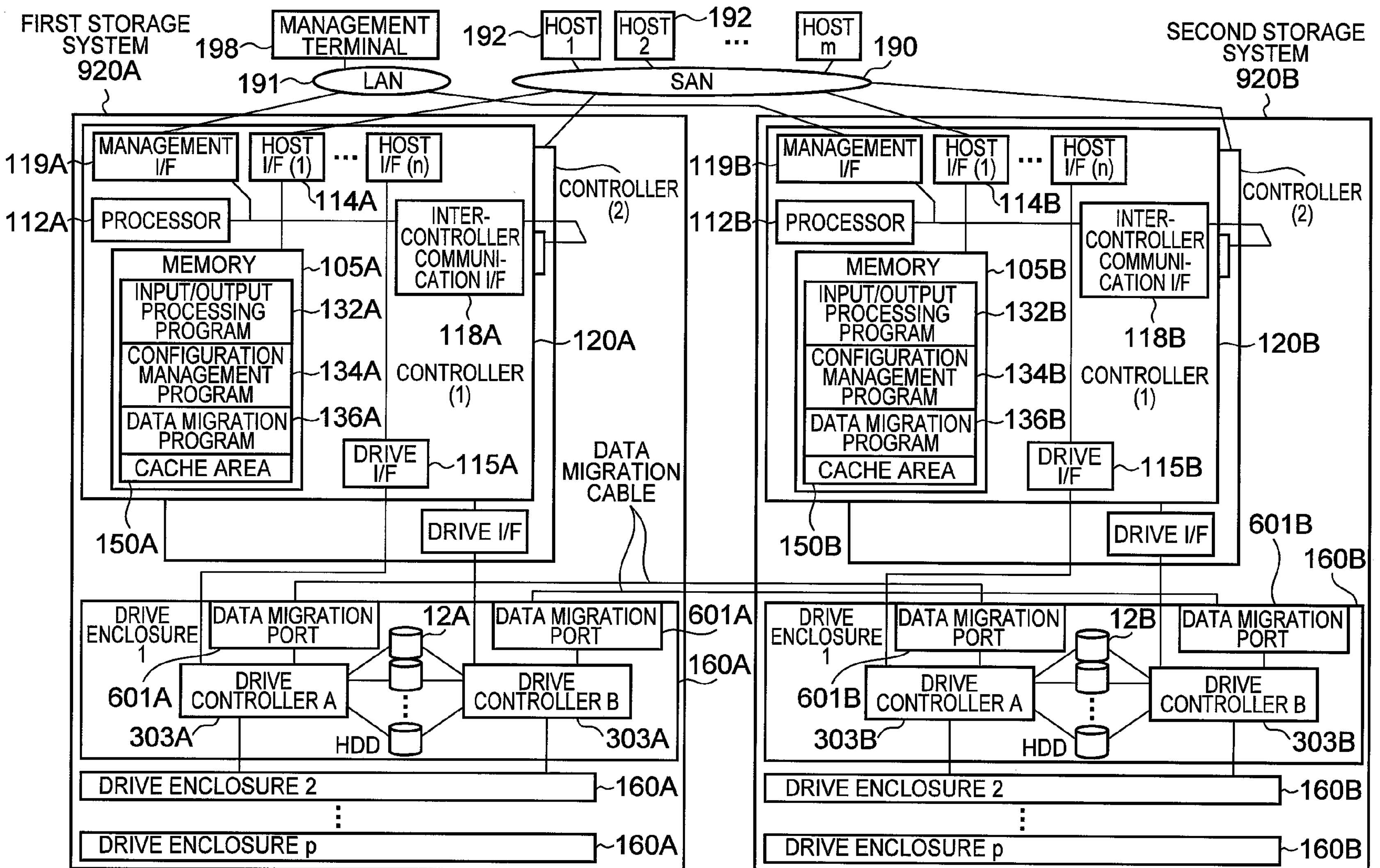
FIG. 1
FIRST STORAGE SYSTEM 920A
MANAGEMENT TERMINAL
198
LAN
191
192
HOST 1
HOST 2
192
HOST m
190
SAN
SECOND STORAGE SYSTEM 920B
119A
MANAGEMENT I/F
HOST I/F (1)
HOST I/F (n)
114A
112A
PROCESSOR
INTER-CONTROLLER COMMUNI-CATION I/F
CONTROLLER (2)
MEMORY
105A
INPUT/OUTPUT PROCESSING PROGRAM
132A
CONFIGURATION MANAGEMENT PROGRAM
134A
DATA MIGRATION PROGRAM
136A
CACHE AREA
118A
120A
CONTROLLER (1)
DRIVE I/F
115A
150A
DRIVE I/F
DATA MIGRATION CABLE
119B
MANAGEMENT I/F
HOST I/F (1)
HOST I/F (n)
114B
112B
PROCESSOR
INTER-CONTROLLER COMMUNI-CATION I/F
CONTROLLER (2)
MEMORY
105B
INPUT/OUTPUT PROCESSING PROGRAM
132B
CONFIGURATION MANAGEMENT PROGRAM
134B
DATA MIGRATION PROGRAM
136B
CACHE AREA
118B
120B
CONTROLLER (1)
DRIVE I/F
115B
150B
DRIVE I/F
601B
160B
DRIVE ENCLOSURE 1
DATA MIGRATION PORT
12A
DATA MIGRATION PORT
601A
160A
601A
DRIVE CONTROLLER A
DRIVE CONTROLLER B
303A
HDD
303A
DRIVE ENCLOSURE 2
160A
DRIVE ENCLOSURE p
160A
DRIVE ENCLOSURE 1
DATA MIGRATION PORT
12B
DATA MIGRATION PORT
601B
DRIVE CONTROLLER A
DRIVE CONTROLLER B
303B
HDD
303B
DRIVE ENCLOSURE 2
160B
DRIVE ENCLOSURE p
160B 501A
505A
503A
USER VOLUME AREA
RAID GROUP 1
LU
LU
RAID GROUP 2
LU
LU
LU
190A
172A
SYSTEM AREA
CONFIGURATION INFORMATION
12A
12A
LU CONFIGURATION MANAGEMENT TABLE
PORT MANAGEMENT TABLE
RAID GROUP MANAGEMENT TABLE
1100A
1200A
1300A DRIVE CONTROLLER
LOCK RELEASE COMMAND RECEIVED
S141
LOCKING VARIABLE?
0
1
S142
CHANGE LOCKING VARIABLE TO 0, AND RESPOND LOCK RELEASE SUCCESS
S143
RESPOND LOCK RELEASE FAILURE
END DRIVE CONTROLLER
LOCK ACQUISITION COMMAND RECEIVED
S131
LOCKING VARIABLE?
0
1
S132
RESPOND LOCK ACQUISITION FAILURE
S133
CHANGE LOCKING VARIABLE TO 1, AND RESPOND LOCK ACQUISITION SUCCESS
END

FIG. 7A

1100A LU CONFIGURATION MANAGEMENT TABLE

| INTERNAL LUN | ALLOCATED HOST ID | HOST LUN | CAPACITY | PHYSICAL LOCATION | RAID GROUP ID | PAIR STATUS |
|---|---|---|---|---|---|---|
| 0 | 1 | 0 | 20GB | STORAGE SYSTEM 1 | 1 | SIMPLE |
| 1 | 1 | 1 | 30GB | STORAGE SYSTEM 1 | 1 | SIMPLE |
| 2 | 2 | 0 | 30GB | STORAGE SYSTEM 1 | 2 | SIMPLE |
| 3 | 2 | 1 | 50GB | STORAGE SYSTEM 1 | 2 | SIMPLE |
| 4 | 3 | 0 | 40GB | STORAGE SYSTEM 1 | 2 | SIMPLE |

FIG. 7B

1200A PORT MANAGEMENT TABLE

| HOST I/F NUMBER | IP ADDRESS | SUBNET MASK | DEFAULT GATEWAY | ALLOCATED INTERNAL LUN |
|---|---|---|---|---|
| 1 | 123.45.67.89 | 255.255.255.0 | 123.45.67.1 | 0,1,2,3 |
| 2 | 123.45.78.9 | 255.255.255.0 | 123.45.78.1 | 4 |
| : | | | | |
| n | | | | |

FIG. 7C

1300A RAID GROUP MANAGEMENT TABLE

| RAID GROUP ID | RAID LEVEL | HDD CONFIGURATION | LU ALLOCATED AREA |
|---|---|---|---|
| 1 | RAID 5 | 1,2,3,4 | ~~~ |
| 2 | RAID 1 | 5,6 | ~~~ |

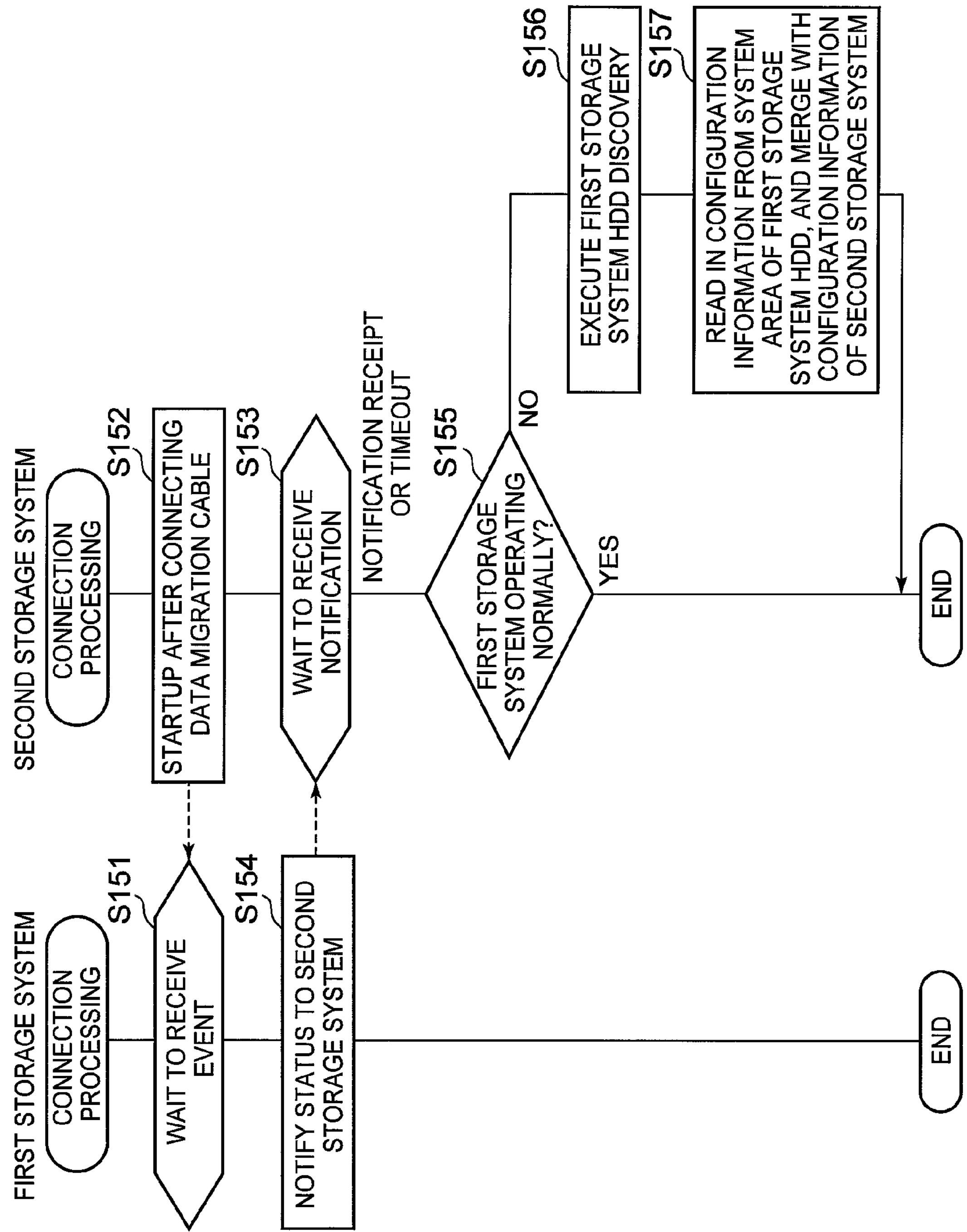
FIG. 8
FIRST STORAGE SYSTEM
CONNECTION PROCESSING
S151
WAIT TO RECEIVE EVENT
S154
NOTIFY STATUS TO SECOND STORAGE SYSTEM
END
SECOND STORAGE SYSTEM
CONNECTION PROCESSING
S152
STARTUP AFTER CONNECTING DATA MIGRATION CABLE
S153
WAIT TO RECEIVE NOTIFICATION
NOTIFICATION RECEIPT OR TIMEOUT
S155
FIRST STORAGE SYSTEM OPERATING NORMALLY?
YES
NO
S156
EXECUTE FIRST STORAGE SYSTEM HDD DISCOVERY
S157
READ IN CONFIGURATION INFORMATION FROM SYSTEM AREA OF FIRST STORAGE SYSTEM HDD, AND MERGE WITH CONFIGURATION INFORMATION OF SECOND STORAGE SYSTEM
END

FIG. 10A

1100A LU CONFIGURATION MANAGEMENT TABLE

| INTERNAL LUN | ALLOCATED HOST | HOST LUN | CAPACITY | PHYSICAL LOCATION | RAID GROUP | PAIR STATUS |
|---|---|---|---|---|---|---|
| 0 | 1 | 0 | 20GB | STORAGE SYSTEM 1 | 1 | SIMPLE |
| 1 | 1 | 1 | 30GB | STORAGE SYSTEM 1 | 1 | SIMPLE |
| 2 | 2 | 0 | 30GB | STORAGE SYSTEM 1 | 2 | SIMPLE |
| 3 | 2 | 1 | 50GB | STORAGE SYSTEM 1 | 2 | SIMPLE |

FIG. 10B

1100B LU CONFIGURATION MANAGEMENT TABLE (INTERNAL LUN = 4 SUBSEQUENT TO LU OWNERSHIP ACQUISITION)

| INTERNAL LUN | ALLOCATED HOST | HOST LUN | CAPACITY | PHYSICAL LOCATION | RAID GROUP | PAIR STATUS |
|---|---|---|---|---|---|---|
| 4 | 3 | 0 | 40GB | STORAGE SYSTEM 1 | 2 | SIMPLE |

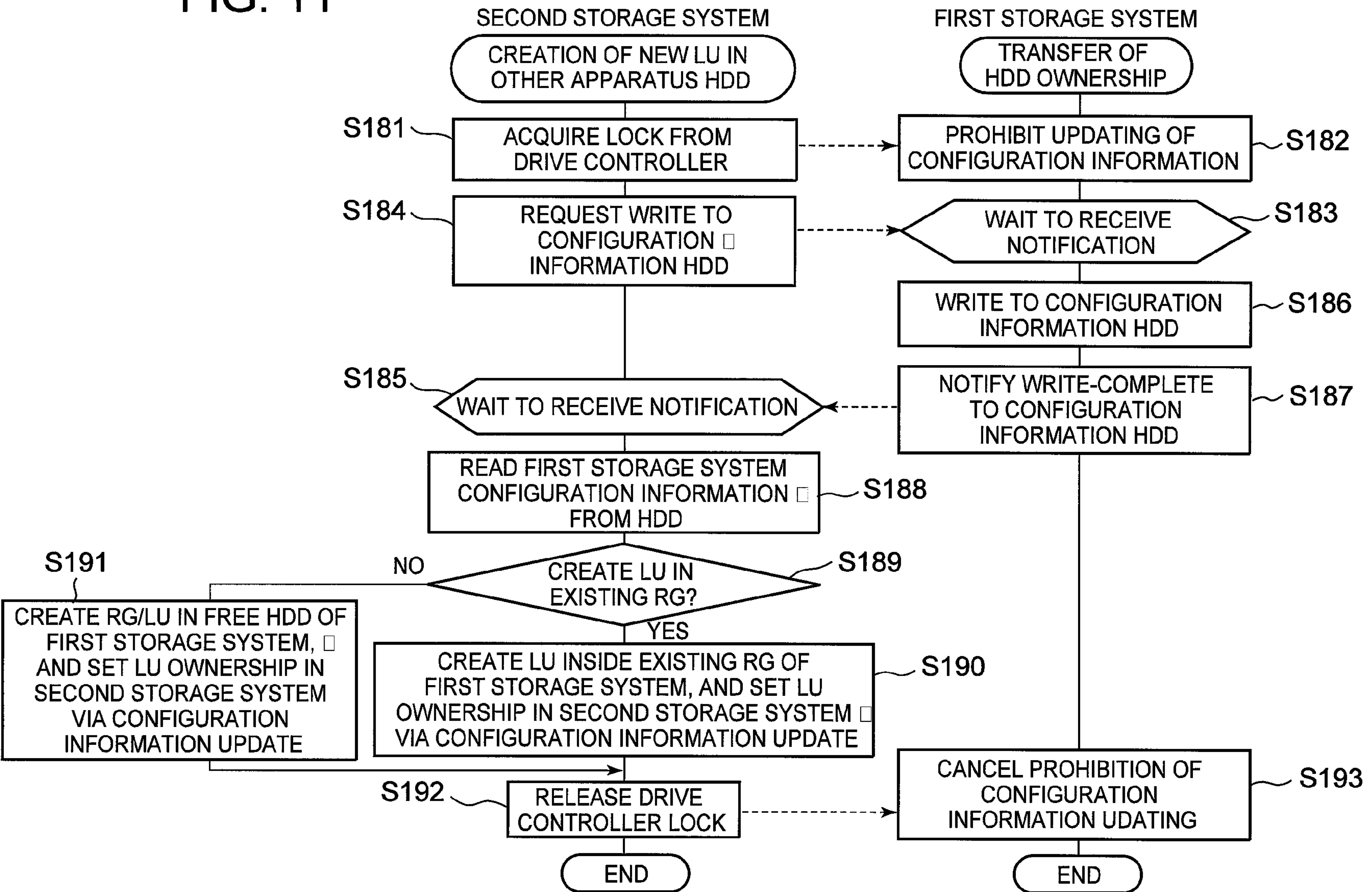
FIG. 11
SECOND STORAGE SYSTEM
CREATION OF NEW LU IN OTHER APPARATUS HDD
S181
ACQUIRE LOCK FROM DRIVE CONTROLLER
S184
REQUEST WRITE TO CONFIGURATION INFORMATION HDD
S185
WAIT TO RECEIVE NOTIFICATION
READ FIRST STORAGE SYSTEM CONFIGURATION INFORMATION FROM HDD
S188
CREATE LU IN EXISTING RG?
S189
NO
YES
S191
CREATE RG/LU IN FREE HDD OF FIRST STORAGE SYSTEM, AND SET LU OWNERSHIP IN SECOND STORAGE SYSTEM VIA CONFIGURATION INFORMATION UPDATE
CREATE LU INSIDE EXISTING RG OF FIRST STORAGE SYSTEM, AND SET LU OWNERSHIP IN SECOND STORAGE SYSTEM VIA CONFIGURATION INFORMATION UPDATE
S190
S192
RELEASE DRIVE CONTROLLER LOCK
END
FIRST STORAGE SYSTEM
TRANSFER OF HDD OWNERSHIP
PROHIBIT UPDATING OF CONFIGURATION INFORMATION
S182
WAIT TO RECEIVE NOTIFICATION
S183
WRITE TO CONFIGURATION INFORMATION HDD
S186
NOTIFY WRITE-COMPLETE TO CONFIGURATION INFORMATION HDD
S187
CANCEL PROHIBITION OF CONFIGURATION INFORMATION UDATING
S193
END

FIG. 12A

1100B LU CONFIGURATION MANAGEMENT TABLE
(INTERNAL LUN = 0 IN EXISTING RAID GROUP 2 AFTER CREATION OF NEW LU)

| INTERNAL LUN | ALLOCATED HOST | HOST LUN | CAPACITY | PHYSICAL LOCATION | RAID GROUP | PAIR STATUS |
|---|---|---|---|---|---|---|
| 4 | 3 | 0 | 40GB | STORAGE SYSTEM 1 | 2 | SIMPLE |
| 0 | 3 | 1 | 15GB | STORAGE SYSTEM 1 | 2 | SIMPLE |

FIG. 12B

1100B LU CONFIGURATION MANAGEMENT TABLE
(INTERNAL LUN = 0 IN NEW RAID GROUP 5 AFTER CREATION OF NEW LU)

| INTERNAL LUN | ALLOCATED HOST | HOST LUN | CAPACITY | PHYSICAL LOCATION | RAID GROUP | PAIR STATUS |
|---|---|---|---|---|---|---|
| 4 | 3 | 0 | 40GB | STORAGE SYSTEM 1 | 2 | SIMPLE |
| 0 | 3 | 1 | 15GB | STORAGE SYSTEM 1 | 5 | SIMPLE |

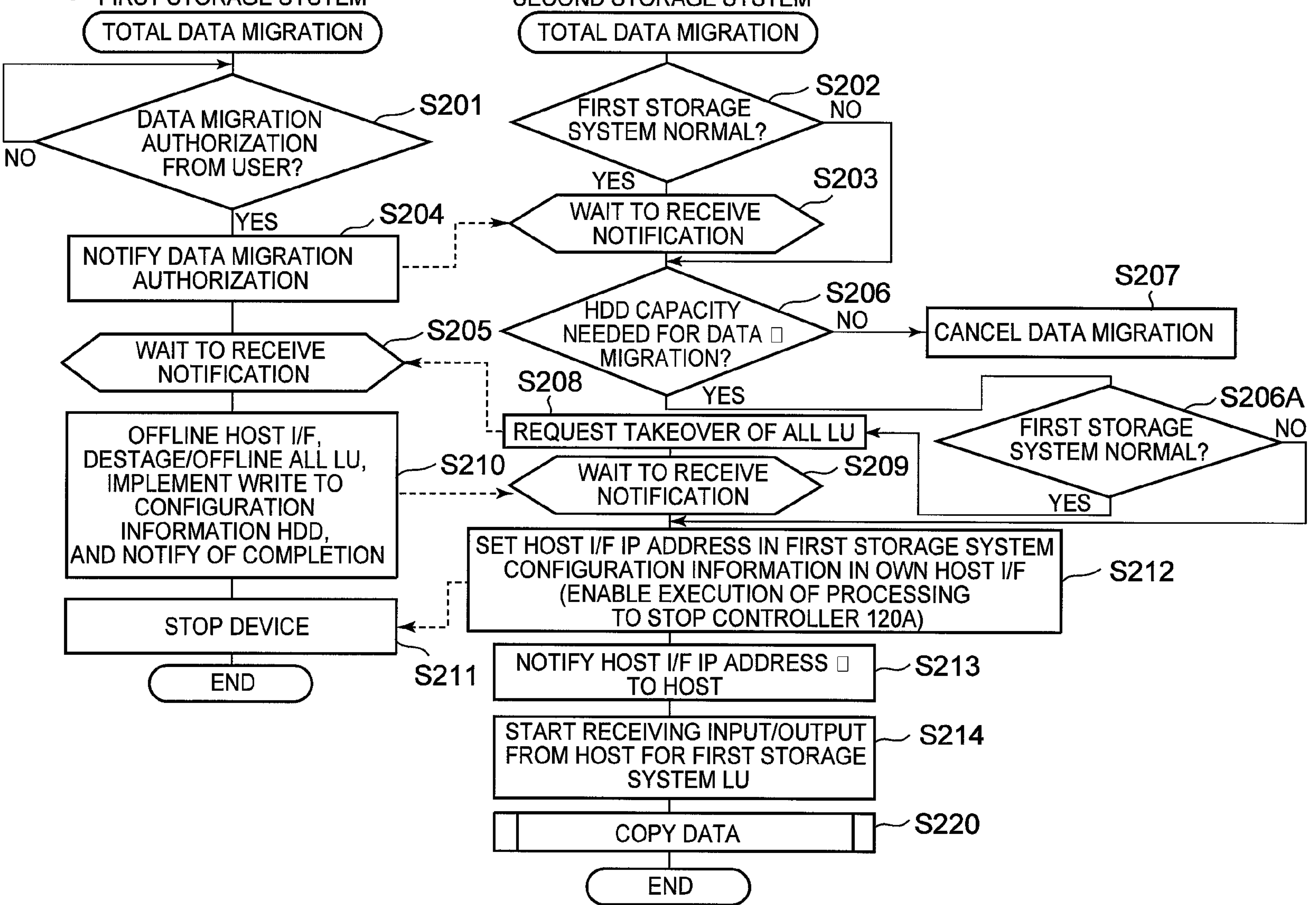
FIG. 13
FIRST STORAGE SYSTEM
TOTAL DATA MIGRATION
S201
DATA MIGRATION AUTHORIZATION FROM USER?
NO
YES
S204
NOTIFY DATA MIGRATION AUTHORIZATION
S205
WAIT TO RECEIVE NOTIFICATION
S210
OFFLINE HOST I/F, DESTAGE/OFFLINE ALL LU, IMPLEMENT WRITE TO CONFIGURATION INFORMATION HDD, AND NOTIFY OF COMPLETION
STOP DEVICE
S211
END
SECOND STORAGE SYSTEM
TOTAL DATA MIGRATION
S202
FIRST STORAGE SYSTEM NORMAL?
NO
YES
S203
WAIT TO RECEIVE NOTIFICATION
S206
HDD CAPACITY NEEDED FOR DATA MIGRATION?
NO
YES
S207
CANCEL DATA MIGRATION
S208
REQUEST TAKEOVER OF ALL LU
S206A
FIRST STORAGE SYSTEM NORMAL?
NO
YES
S209
WAIT TO RECEIVE NOTIFICATION
S212
SET HOST I/F IP ADDRESS IN FIRST STORAGE SYSTEM CONFIGURATION INFORMATION IN OWN HOST I/F (ENABLE EXECUTION OF PROCESSING TO STOP CONTROLLER 120A)
S213
NOTIFY HOST I/F IP ADDRESS TO HOST
S214
START RECEIVING INPUT/OUTPUT FROM HOST FOR FIRST STORAGE SYSTEM LU
S220
COPY DATA
END

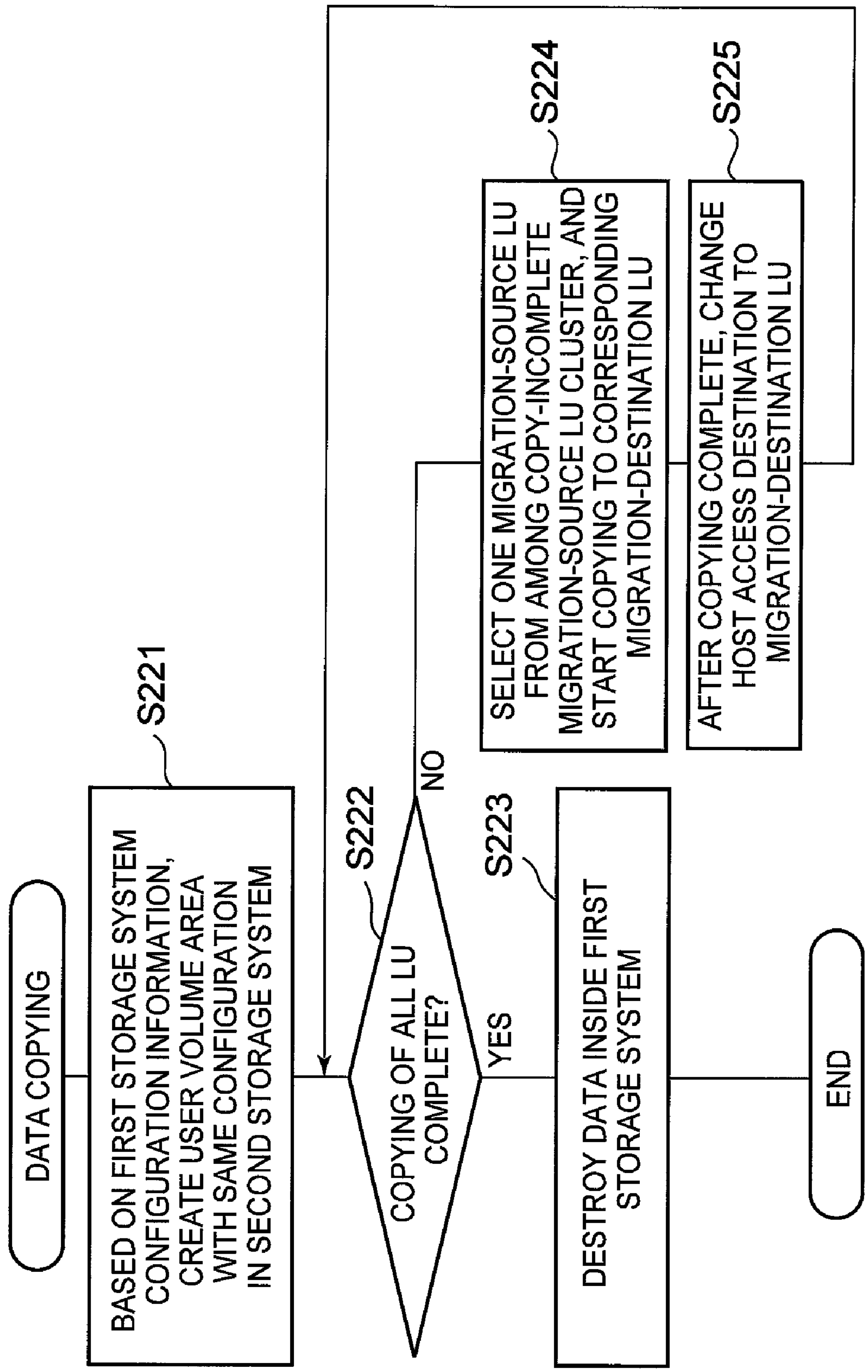
FIG. 14
DATA COPYING
BASED ON FIRST STORAGE SYSTEM CONFIGURATION INFORMATION, CREATE USER VOLUME AREA WITH SAME CONFIGURATION IN SECOND STORAGE SYSTEM
S221
COPYING OF ALL LU COMPLETE?
S222
YES
NO
DESTROY DATA INSIDE FIRST STORAGE SYSTEM
S223
END
SELECT ONE MIGRATION-SOURCE LU FROM AMONG COPY-INCOMPLETE MIGRATION-SOURCE LU CLUSTER, AND START COPYING TO CORRESPONDING MIGRATION-DESTINATION LU
S224
AFTER COPYING COMPLETE, CHANGE HOST ACCESS DESTINATION TO MIGRATION-DESTINATION LU
S225

FIG. 15

1100B LU CONFIGURATION MANAGEMENT TABLE (SUBSEQUENT TO TAKEOVER OF LU OWNERSHIP)

| INTERNAL LUN | ALLOCATED HOST | HOST LUN | CAPACITY | PHYSICAL LOCATION | RAID GROUP ID | MIGRATION-SOURCE LUN | MIGRATION STATUS | PAIR STATUS |
|---|---|---|---|---|---|---|---|---|
| 0 | 1 | 0 | 20GB | STORAGE SYSTEM 1 | 1 | – | INCOMPLETE | SIMPLE |
| 1 | 1 | 1 | 30GB | STORAGE SYSTEM 1 | 1 | – | INCOMPLETE | SIMPLE |
| 2 | 2 | 0 | 30GB | STORAGE SYSTEM 1 | 2 | – | INCOMPLETE | SIMPLE |
| 3 | 2 | 1 | 50GB | STORAGE SYSTEM 1 | 2 | – | INCOMPLETE | SIMPLE |
| 4 | 3 | 0 | 40GB | STORAGE SYSTEM 1 | 2 | – | INCOMPLETE | SIMPLE |
| 5 | – | – | 20GB | STORAGE SYSTEM 2 | 1 | 0 | INCOMPLETE | SIMPLE |
| 6 | – | – | 30GB | STORAGE SYSTEM 2 | 1 | 1 | INCOMPLETE | SIMPLE |
| 7 | – | – | 30GB | STORAGE SYSTEM 2 | 2 | 2 | INCOMPLETE | SIMPLE |
| 8 | – | – | 50GB | STORAGE SYSTEM 2 | 2 | 3 | INCOMPLETE | SIMPLE |
| 9 | – | – | 40GB | STORAGE SYSTEM 2 | 2 | 4 | INCOMPLETE | SIMPLE |

FIG. 16

1100B LU CONFIGURATION MANAGEMENT TABLE (DURING DATA COPYING)

| INTERNAL LUN | ALLOCATED HOST | HOST LUN | CAPACITY | PHYSICAL LOCATION | RAID GROUP ID | MIGRATION-SOURCE LUN | MIGRATION STATUS | PAIR STATUS |
|---|---|---|---|---|---|---|---|---|
| 0 | – | – | 20GB | STORAGE SYSTEM 1 | 1 | – | COMPLETE | SIMPLE |
| 1 | – | – | 30GB | STORAGE SYSTEM 1 | 1 | – | COMPLETE | SIMPLE |
| 2 | 2 | 0 | 30GB | STORAGE SYSTEM 1 | 2 | – | MIGRATING | COPY-SOURCE |
| 3 | 2 | 1 | 50GB | STORAGE SYSTEM 1 | 2 | – | INCOMPLETE | SIMPLE |
| 4 | 3 | 0 | 40GB | STORAGE SYSTEM 1 | 2 | – | INCOMPLETE | SIMPLE |
| 5 | 1 | 0 | 20GB | STORAGE SYSTEM 2 | 1 | – | COMPLETE | SIMPLE |
| 6 | 1 | 1 | 30GB | STORAGE SYSTEM 2 | 1 | – | COMPLETE | SIMPLE |
| 7 | – | – | 30GB | STORAGE SYSTEM 2 | 2 | 2 | MIGRATING | COPY-DESTINATION |
| 8 | – | – | 50GB | STORAGE SYSTEM 2 | 2 | 3 | INCOMPLETE | SIMPLE |
| 9 | – | – | 40GB | STORAGE SYSTEM 2 | 2 | 4 | INCOMPLETE | SIMPLE |

FIG. 17

1100B LU CONFIGURATION MANAGEMENT TABLE (AFTER COMPLETION OF DATA COPYING)

| INTERNAL LUN | ALLOCATED HOST | HOST LUN | CAPACITY | PHYSICAL LOCATION | RAID GROUP ID | MIGRATION-SOURCE LUN | MIGRATION STATUS | PAIR STATUS |
|---|---|---|---|---|---|---|---|---|
| 0 | – | – | 20GB | STORAGE SYSTEM 1 | 1 | – | COMPLETE | SIMPLE |
| 1 | – | – | 30GB | STORAGE SYSTEM 1 | 1 | – | COMPLETE | SIMPLE |
| 2 | – | – | 30GB | STORAGE SYSTEM 1 | 2 | – | COMPLETE | SIMPLE |
| 3 | – | – | 50GB | STORAGE SYSTEM 1 | 2 | – | COMPLETE | SIMPLE |
| 4 | – | – | 40GB | STORAGE SYSTEM 1 | 2 | – | COMPLETE | SIMPLE |
| 5 | 1 | 0 | 20GB | STORAGE SYSTEM 2 | 1 | – | COMPLETE | SIMPLE |
| 6 | 1 | 1 | 30GB | STORAGE SYSTEM 2 | 1 | – | COMPLETE | SIMPLE |
| 7 | 2 | 0 | 30GB | STORAGE SYSTEM 2 | 2 | – | COMPLETE | SIMPLE |
| 8 | 2 | 1 | 50GB | STORAGE SYSTEM 2 | 2 | – | COMPLETE | SIMPLE |
| 9 | 3 | 0 | 40GB | STORAGE SYSTEM 2 | 2 | – | COMPLETE | SIMPLE |

STORAGE SYSTEM FOR BACK-END COMMUNICATIONS WITH OTHER STORAGE SYSTEM

CROSS-REFERENCE TO PRIOR APPLICATION

This application relates to and claims the benefit of priority from Japanese Patent Application No. 2006-278566 filed on Oct. 12, 2006, the entire disclosure of which is incorporated herein by reference. This application relates to Japanese Patent Application No. 2006-278237 filed on Oct. 12, 2006, the entire disclosure of which is incorporated herein by reference.

BACKGROUND

The present invention relates to a storage system that is connected to another storage system.

A first storage system is connected to a second storage system, for example, when data stored in a first storage system is migrated to a second storage system. The technology disclosed in Patent Literature 1 (Japanese Laid-open Patent No. 2004-102374) is an example of data migration technology.

For example, as a first storage system, a storage system comprising a first controller, a plurality of (or one) first storage devices, and a first switching apparatus interposed between the first controller and the first storage devices can be considered. In this case, the constitution can be such that the first controller receives an input/output request (write request/read request) sent from a first upper-level device (for example, a host computer), and, in accordance with the received input/output request, carries out a data write and/or read to any one of the above-mentioned plurality of first storage devices via the first switching apparatus. Further, as a second storage system, a storage system comprising the same constitution as the first storage system can be considered (For components that are the same as those of the first storage system, the term "first" is re-read as "second.")

For example, technology, which directly links first and second controllers via a leased line (for example, cable) for inter-controller communications, can be considered as one inter-storage system communications technology. There are times when another, different communications technology is desirable. Further, the interconnection of storage systems is not limited to instances of data migration; other types of cases are also possible.

SUMMARY

Therefore, an object of the present invention is to provide a novel communications technology between storage systems.

Other objects of the present invention will become clear from the explanations that follow.

A shared memory is provided in at least one of the first and second switching apparatuses. The constitution is such that the first and second controllers communicate with one another via this shared memory.

More specifically, for example, the switching apparatus comprising this shared memory comprises a switching controller (for example a microprocessor) for receiving an update command and/or a reference command for updating and/or referencing the shared memory from a plurality of command issuing units (for example, SCSI initiators). When a controller sends a message to the other controller, it sends an update command together with this message to the switching controller, thereby enabling the message to be written to the shared memory. Similarly, when a controller receives a message from the other controller, the controller sends a reference command to the switching controller, thereby enabling the message to be read from the shared memory.

BRIEF DESCRIPTION OF THE DRAWINGS

FIG. 1 shows a block diagram of a computer system related to a first working example of the present invention;

FIG. 7A shows an example of the constitution of a LU configuration management table 1100A;

FIG. 7B shows an example of the constitution of a port management table 1200A;

FIG. 7C shows an example of the constitution of a RAID group management table 1300A;

FIG. 8 shows a flowchart of processing executed when first drive controllers 303A and 303*b* are connected via a data migration cable 930;

FIG. 10A shows an example of a LU configuration management table 1100A subsequent to the transfer of LU ownership;

FIG. 10B shows an example of a LU configuration management table 1100B subsequent to the transfer of LU ownership;

FIG. 11 is a flowchart of processing for the second storage system 920B to set a LU subordinate to itself in a free portion of a user volume area 501A of the first storage system 920A;

FIG. 12A shows an example of a LU configuration management table 1100B when S190 of FIG. 11 is executed;

FIG. 12B shows an example of a LU configuration management table 1100B when S191 of FIG. 11 is executed;

FIG. 13 is a flowchart of processing executed when all the data inside the first storage system 920A migrates to the second storage system 920B;

FIG. 14 is a flowchart of the data copying of S220 of FIG. 13;

FIG. 15 is an example of the LU configuration management table 1100B in S221 of FIG. 14;

FIG. 16 shows an example of the LU configuration management table 1100B in S224 and S225 of FIG. 14;

FIG. 17 shows an example of the LU configuration management table 1100B in S223 of FIG. 14;

DESCRIPTION OF THE PREFERRED EMBODIMENT

The concept of an embodiment of the present invention will be explained.

In a first and second storage system, a first and second switching apparatus are interposed between a first and second controller and a storage device. A shared memory is provided in at least one of the first and second switching apparatuses. The constitution is such that the first and second controllers communicate with one another via this shared memory.

Figure 20A:
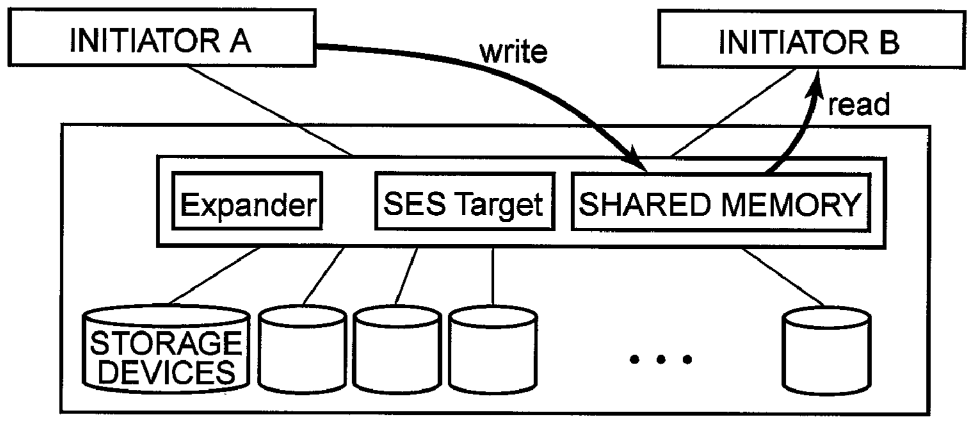
FIG. 20A shows a conceptual example of the embodiment of the present invention.

FIG. 20A shows a specific example. The switching apparatus, for example, is a SAS (Serial Attached SCSI) Expander. A shared memory is provided in the Expander. The Expander is constituted having an SES target so as to be able to receive an SES (SCSI Enclosure Services) command, which conforms to SCSI specifications, from a plurality of initiators A and B (for example, a first and second controller). As SES commands, there is a command for referencing the internal state of a SES target, and a command for updating this internal state. Using this internal state as a shared memory enables a message to be exchanged between the plurality of initiators A and B via this shared memory.

Figure 20B:
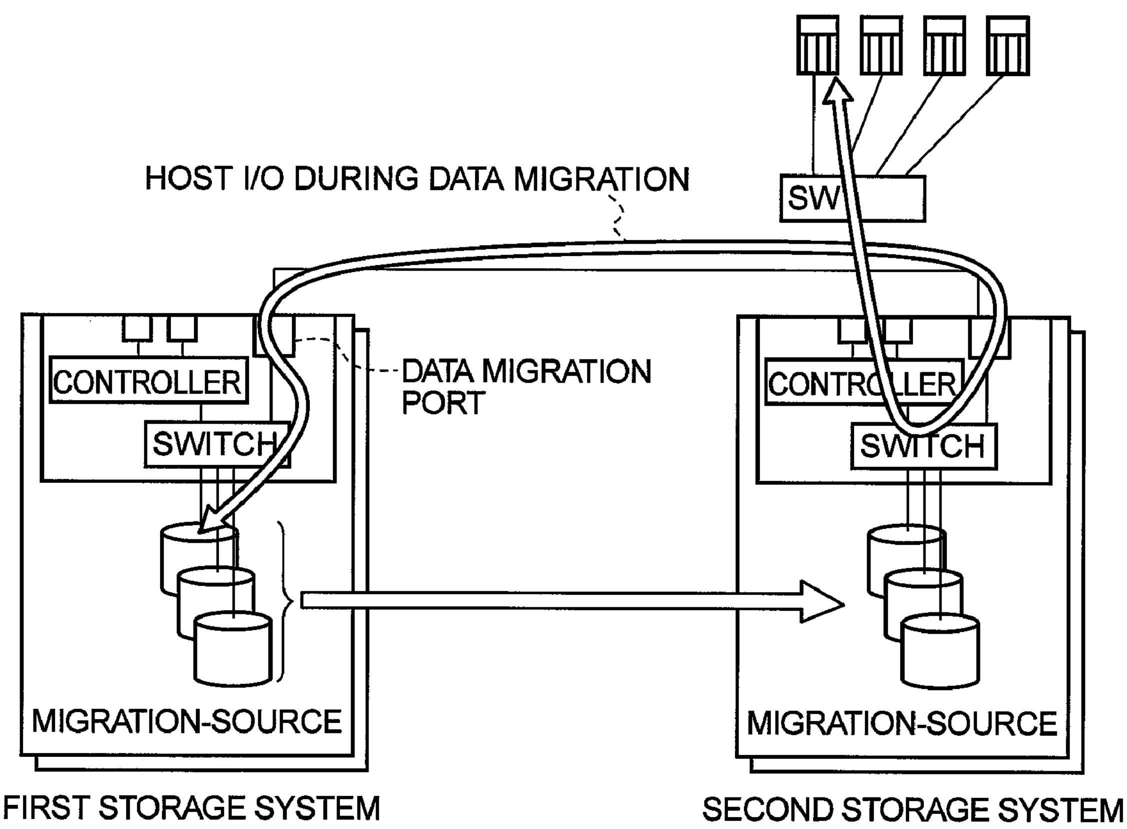
FIG. 20B shows a conceptual example of another version of this embodiment.

Further, as shown in FIG. 20B, dedicated data migration ports independent of the host connection ports (ports to which a host computer is connected) are provided in the switching apparatuses of the respective storage systems. The dedicated data migration ports are connected by a leased line, and data migration is executed via this leased line. Further, the migration-destination controller is able to process an input/output request from a host computer during data migration, thereby enabling data to be read out from a LU of the first storage system by way of the leased line (e.g. cable) and provided to the host computer, and enabling data to be written to the LU via the leased line.

A number of working examples of the present invention will be explained hereinbelow by referring to the figures. In can be supposed at this time that a storage device mounted to a storage system is a hard disk drive (hereinafter referred to as HDD), for example, but a variety of storage devices, such as a DVD (digital versatile disk) drive, magnetic tape drive, and flash memory can be used instead of this HDD.

First Working Example

FIG. 1 shows a block diagram of a computer system related to a first working example of the present invention. Furthermore, in FIG. 1, there are first and second storage systems, and the same numerals with different reference letters are assigned to the same elements of these storage systems. In this case, the reference letter "A" is assigned to the first storage system, and the reference letter "B" is assigned to the second storage system. Hereinbelow, when the same elements are not to be distinguished from one another, they will be explained using only a numeral, and when they are to be distinguished from one another, a combination of a numeral followed by a reference letter will be used.

A plurality (or one) of host computers 192, and first and second storage systems 920A and 920B are connected to a SAN (Storage Area Network) 190. A different type of communications network can be used instead of the SAN 190.

A management terminal 198 and the first and second storage systems 920A and 920B are connected to a LAN (Local Area Network) 191. Instead of the LAN 191, another type of communications network can be used.

The host computer 192 sends an input/output request (write request/read request) to a storage system 920, thereby either writing or reading data to or from the storage system 920A.

The management terminal 198 is a computer for managing the first and second storage systems 920A and 920B. The management terminal 198, for example, can provide a user interface, such as a GUI (Graphical User Interface) or CLI (Common Line Interface), required for work related to creating a logical unit (also called a logical volume), setting security, or otherwise changing configuration information, which will be explained hereinbelow. The processing carried out by the management terminal 198 will be described in detail below.

Since the hardware configurations of the first and second storage systems 920A and 920B are approximately the same, an explanation will be given using the first storage system 920A as a representative example.

The first storage system 920A comprises a controller 120A, and either one or a plurality of drives 160A. In this subsystem 920A, the controller 120A and either one or a plurality of drives 160A are cascadingly connected. If the flow of data from the host computer 192 to a HDD 12A during a data write is taken as an example, this connection configuration is constituted such that the controller 120A is the furthest upstream, and thereafter, the connections continue downstream as drive 1, drive 2, . . . drive p (where p is an integer of greater than 1 (here an integer of greater than 3)). Hereinbelow, when indicating this kind of connection configuration in this working example, the term "cascade connection configuration" will be used. A cascade connection configuration, for example, is not limited to a straight line as shown in the figure, and, for example, can also be a tree-shaped configuration.

The controller 120A is an apparatus for controlling the operations of the first storage system 920A, and differs from a switching apparatus like the first drive controller 303A comprised in the drive enclosure 160A. The controller 120A, for example, is made redundant (for example, duplexed), and each controller 120A is connected to another controller 120A via an inter-controller communication interface apparatus (hereinafter abbreviated as interface "I/F") 118A. Thus, it is possible for a failure that occurred in one controller 120A to be detected by another controller 120A, and for the other controller 120A to carry out a degenerate operation. Further, in this working example, the constitution is such that the access routes to the respective HDD 12A have also been made redundant, and even if a failure should occur on one access route, the controller 120A can access a HDD 12A via another access route.

The controller 120A comprises either one or a plurality of host I/F 114A, a management I/F 119A, a processor 112A, a memory 105A, and a drive I/F 115A.

The respective host I/F 114A, for example, are communication ports, and receive an input/output request from the host computer 192.

The management I/F 119A, for example, is a communication port, and receives a command from the management terminal 198.

The memory 105A stores a plurality of computer programs and data. The plurality of computer programs, for example, include an input/output processing program 132A, a configuration management program 134A, and a data migration program 136A. Further, a cache area 150A is provided in the memory 105A, and data to be written to or read from a HDD 12A by the host computer 192 is temporarily stored in this cache area 150A.

The drive I/F 115A is an interface apparatus for communicating with a HDD 12A via the first drive controller 303A of the drive enclosure 160A.

The processor 112A, for example, is a CPU (Central Processing Unit), and executes the reading in of a computer program stored in the memory 105A. Hereinbelow, when a computer program is the subject, the explanation will describe the processing performed by the processor that actually executes this computer program.

The input/output processing program 132A processes an input/output request received by the host I/F 114A. When the input/output request is a write request, the input/output processing program 132A temporarily writes data that complies with this write request to the cache area 150A, reads this data out from the cache area 150A and writes it to a HDD 12A. Conversely, when the input/output request is a read request, the input/output processing program 132A reads the data out from the HDD 12A, writes this data temporarily to the cache area 150A, reads this data out from the cache area 150A, and sends it to the host computer 192 that is the source of this read request.

The configuration management program 134A is a program for managing configuration information, which will be explained below. The configuration management program 134A, for example, can update configuration information in response to a command from the management terminal 198.

The data migration program 136A executes data migration between logical units (LU). The processing carried out by the data migration program 136A will be explained in detail below.

A drive enclosure 160A comprises redundant first drive controllers 303A and data migration ports 601A. Either one or a plurality of HDD 12A are connected to the respective first drive controllers 303A. A data migration port 601A is connected to a first drive controller 303A, and is not connected to the controller 120A. A data migration port 601A is connected via a leased line (hereinafter, data migration cable) 930 to a data migration port 601B of the second storage system 920B. A communications network can be used instead of the data migration cable 930. But in either case, in this working example, communications between the first drive controllers 303A and 303B, in other words, communications between the storage systems 920A and 920B is carried out via this data migration cable 930, which comprises the back-end, and is not carried out via the SAN 190 to which the controllers 120A and 120B are connected. However, if this back-end communications should become impossible, communications can also be carried out between the controllers 120A and 120B by way of the SAN 190.

The preceding is an overview of a computer system related to this working example. Furthermore, the data migration cable 930 can be redundant, or it can be a single cable. Further, controller 120A, first drive controller 303A, and data migration port 601A can be implemented on a single circuit board. More specifically, for example, memory 105A and a memory 185A described hereinbelow (a memory 185A that belongs to the first drive controller 303A) can be a single memory, and the processor 301A is a processor that is independent of the processor 112A that processes an input/output request from a host computer 192. This independent processor 301A can write a message between processors 112A and 112B to memory, or read from memory and provide a message between processors 112A and 112B.

Next, the first drive controller 303A will be explained in detail.

Figure 2:
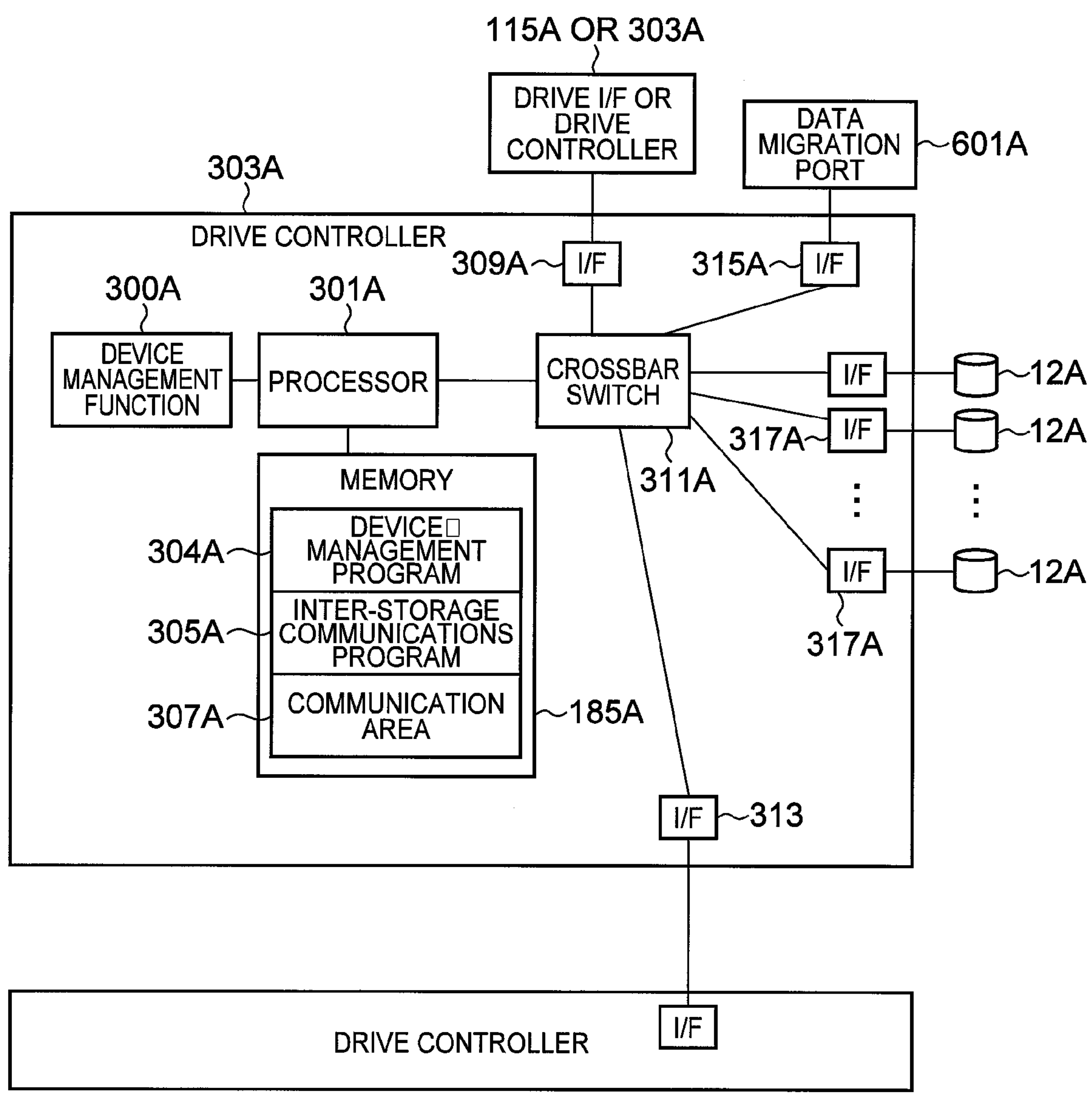
FIG. 2 shows a block diagram of a first drive controller 303A.

FIG. 2 shows a block diagram of the first drive controller 303A.

The first drive controller 303A is a switching apparatus. This switching apparatus, for example, can be an Expander of an SAS (Serial Attached SCSI), or it can be a Fibre Channel switching apparatus. A drive controller 303 comprises a device manager 300A, a memory 185A, a processor 301A, a crossbar switch 311A, and a plurality of I/F 309A, 315A, 313A, and 317A.

The device manager 300A is a device for acquiring information from a prescribed component inside the first storage system 920A. For example, the device manager 300A can acquire from a fan (for example, a fan for cooling the HDD 12A), or a thermometer information (for example, a measured temperature from the thermometer) required for managing the first storage system 920A.

The processor 301A, for example, is a CPU, and can read out and execute a computer program from memory 185A.

The memory 185A stores a device management program 304A and an inter-storage communications program 305A. The device management program 304A is a program for managing a prescribed component of the first storage system 920A, and, for example, based on information acquired by the device manager 300A, can perform HDD 12A blockage processing, and control the power unit and fan. The inter-storage communications program 305A is a program for carrying out back-end communications between the storage systems 920A and 920B. Inter-storage communications program 305A can communicate with partner inter-storage communications program 305B via a data migration port 601A.

Further, a communications area 307A, which is a storage area for communications between a plurality of initiators, is provided in memory 185A. This communications area 307A is a storage area that is shared by a plurality of initiators. Furthermore, initiator as used here refers to a processor that constitutes the controllers 120A and 120B of this working example, and more specifically, the command issuing units of the controllers 120A and 120B.

The crossbar switch 311A is an apparatus for switching the mutual connections between the processor 112A and the plurality of I/F 309A, 315A, 313A and 317A. Instead of a crossbar switch 311A, another type of switching unit (for example, a data transmission circuit as one type of LSI (Large-Scale Integration)) can be used.

Each of the plurality of I/F 309A, 315A, 313A and 317A, for example, is a communication port (more specifically, the "Phy" in a SAS Expander). Of the plurality of I/F 309A, 315A, 313A and 317A, I/F 315A can be a different type of I/F than the other I/F 309A, 313A, 317A. These I/F can take a switch type (star type) topology, and are also applicable to SAS and Fibre Channel.

In this working example, for example, the configuration is the above-mentioned cascade connection configuration comprising controller 120A, first drive controller 303A of drive 1, first drive controller 303A of drive 2, . . . , and first drive controller 303A of drive p. An upstream I/F (either the drive I/F 115A of the controller 120A or the I/F 131A of an upstream first drive controller 303A) is connected to I/F 309A. A downstream I/F (I/F 309A of the downstream first drive controller 303A, and when this first drive controller 303A is the furthest downstream, either nothing can be connected, or the HDD 12A can be connected) is connected to I/F 313A. The HDD 12A is connected to I/F 317A.

Figure 3:
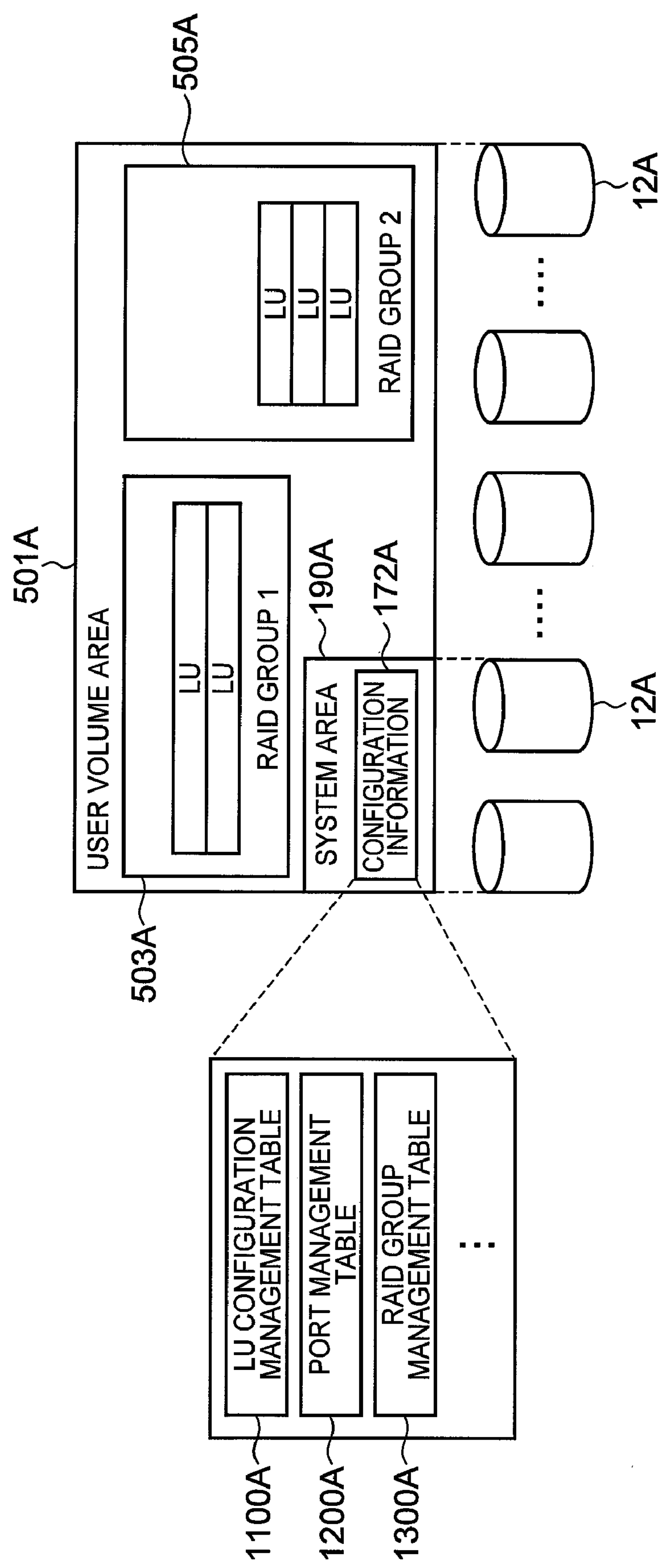
FIG. 3 is a schematic diagram of one example of allocation of the storage space of a plurality of HDD.

FIG. 3 is a schematic diagram of one example of allocation of the storage space of a plurality of HDD.

The storage space of a plurality of HDD 12A can be broadly divided into a user volume area 501A and a system area 190A.

The user volume area 501A is an area for storing data (user data) used by an application program executed by the host computer 192. More specifically, for example, it is a group of LU created using the storage space of a RAID (Redundant Array of Independent (or Inexpensive) Disks) constituted from two or more HDD 12A.

The system area 190A is either a part or all of the area of one or more HDD 12A, and is an area for storing information (hereinafter, configuration information) 172A related to the configuration of the first storage system 920A. Configuration information 172A, for example, comprises a LU configuration management table 1100A, a port management table 1200A, and a RAID group management table 1300A. The configuration information 172A, for example, can be stored in a prescribed address of a prescribed HDD 12A in a prescribed format so as to be accessible from a second storage system A connected to the data migration port 601A. Or, for example, the locations of the configuration information 172A and 172B can be recognized by each of the controllers 120A and 120B by exchanging information indicating the location where the configuration information 172 is stored in accordance with sending and receiving messages via the communications area 307 of a drive controller 303.

FIG. 7A shows an example of the constitution of a LU configuration management table 1100A.

The LU configuration management table 1100A is a table for managing LU, and, for example, an internal LUN, allocated host ID, host LUN, capacity, physical location, RAID group ID, and pair status are recorded in this table 1100A for each LU. The internal LUN is a LUN for the first storage system 920A to identify a LU (hereinafter, target LU). By contrast, the host LUN is a LUN for the host computer 192 to identify a target LU. The allocated host ID is an identifier of the host computer that is the allocation destination of a target LU. The input/output processing program 132A allows a host with an allocated host ID of "1" to access a LU having an internal LUN of 0 and 1, but prohibits access to LU of internal LUN other therethan. The capacity is the capacity of a target LU. The physical location expresses the location of a target LU, and, for example, is a storage system identifier. By virtue of the fact that this physical location column is a single point, and can record a physical location, the first storage system 920A can have a LU that is on an HDD 12B of the second storage system 920B. The RAID group ID is an identifier of the RAID group to which the target LU belongs. The pair status is the status of the LU pair comprising the target LU. A pair status of "simple" refers to the fact that the partner LU, which, together with the target LU, constitutes a LU pair, does not exist.

FIG. 7B shows an example of the constitution of a port management table 1200A.

The port management table 1200A is a table for managing information related to respective host I/F 114A. For example, a host I/F number (identification number of a host I/F 114A), an IP address, a subnet mask, a default gateway, and an allocated internal LUN are recorded in this table 1200A for each host I/F 114A. The allocated internal LUN is the internal LUN of a LU allocated to a host I/F (a LU accessible via this host I/F). In this working example, it is supposed that a host I/F 114A is an iSCSI port. Therefore, a setting required for an iSCSI-based IP is recorded in this port management table 1200A.

FIG. 7C shows an example of the constitution of a RAID group management table 1300A.

The RAID group management table 1300A is a table for managing information related to respective RAID groups. For example, a RAID group ID, a RAID level, a HDD configuration, and a LU allocated area are recorded in this table 1300A for each RAID group. The RAID group ID is the identifier of a RAID group. The HDD configuration is the identification number of the respective HDD 12A constituting a RAID group. The LU allocated area indicates a part of the RAID group-provided storage space that has been allocated as a LU. A free (non-allocated) storage space part can be specified from this LU allocated area, making it possible to use this storage space part to create a new LU.

Figure 4:
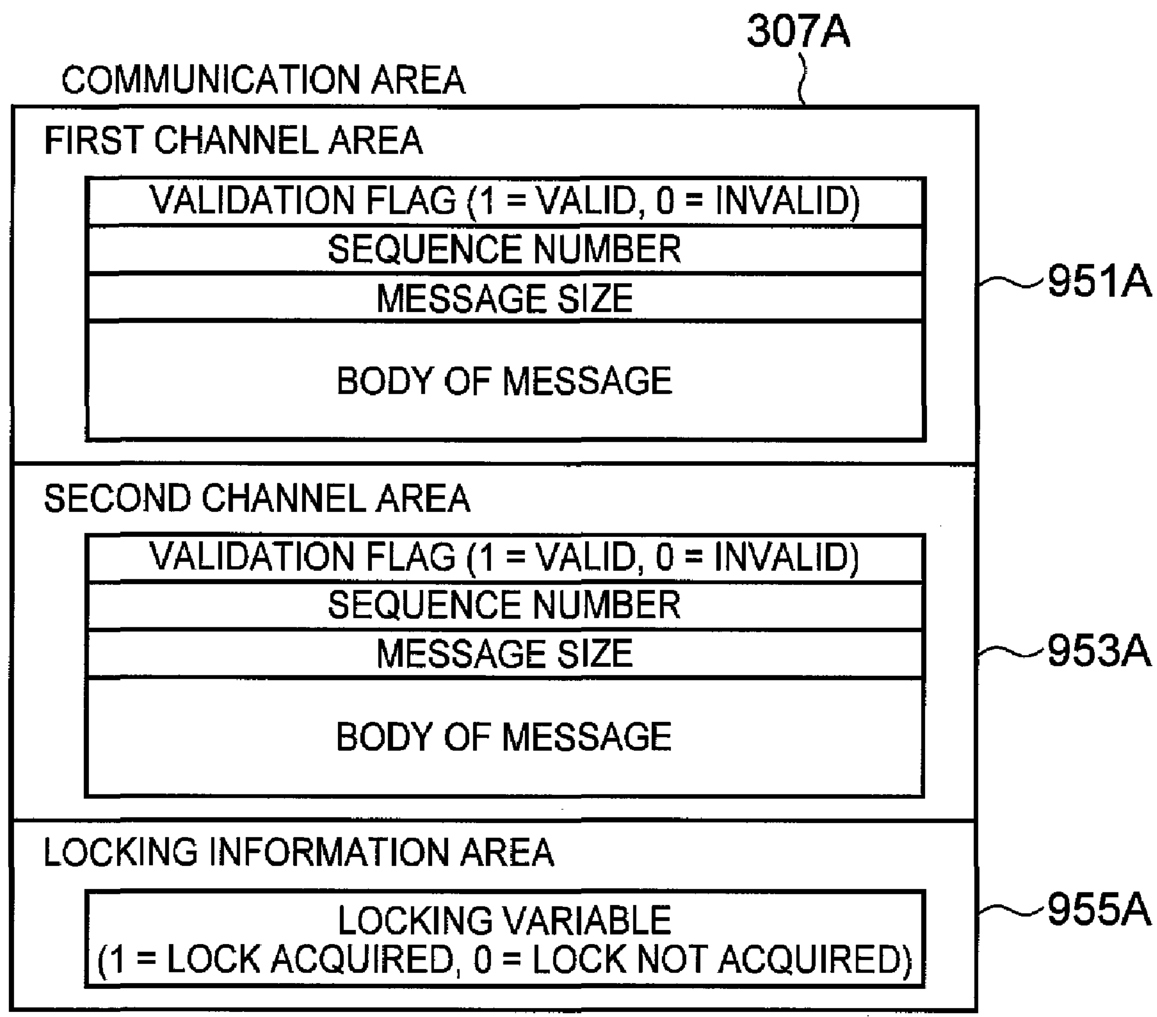
FIG. 4 shows an example of the constitution of a communications area 307A.

FIG. 4 shows an example of the constitution of a communications area 307A.

The communications area 307A comprises a first channel area 951A, a second channel area 953A, and a locking information area 955A. In this working example, two channels are provided, but three or more channels can be provided. Further, a plurality of locking information areas can also be provided.

Each channel area 951 is an area utilized as a channel for sending a message. The first channel area 951A is the area of the channel in the direction from the first storage system 920A to the second storage system 920B. The second channel area 953A is the area of the channel in the direction from the second storage system 920B to the first storage system 920A.

The following information areas are included in each channel area 951. That is, an area in which a validation flag is written, an area in which a sequence number is written, an area in which a message size is written, and an area in which the body of a message is written. The validation flag is a flag, which indicates whether or not a message was sent to the intended communication partner. The sequence number is used to check whether or not a new message, which differs from that checked by the receiver the previous time, has been written (a message can be determined to be new if the number is different from the previous time). The sequence number can be incremented by the message sender. The message size is the data size of the body of a message. The body of a message is the message itself.

The locking information area 955A is an area utilized for the exclusive control of an update to the configuration information 172A. More specifically, for example, a locking variable, which can be constituted from one bit of either a 0 or a 1, is written in the locking information area 955A. A locking variable of 1 indicates lock acquisition is complete, and a locking variable of 0 indicates that lock has not been acquired. Here, when lock has been acquired, updating of the configuration information 172A inside the first storage system 920A is prohibited (in other words, exclusive control is achieved). Furthermore, the exclusive control range can be changed, and a locking variable can be provided for each exclusive control target (for example, LU, and configuration information 172A).

The flows of the various processes carried out in this working example will be explained hereinbelow.

Figure 5A:
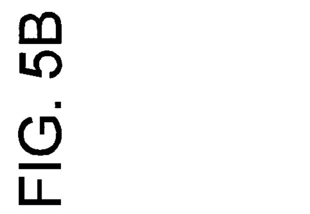
FIG. 5A shows a flowchart of the processing of a controller 120A (processor 112A) when a first storage system 920A sends a message to a second storage system 920B.
Figure 5B:
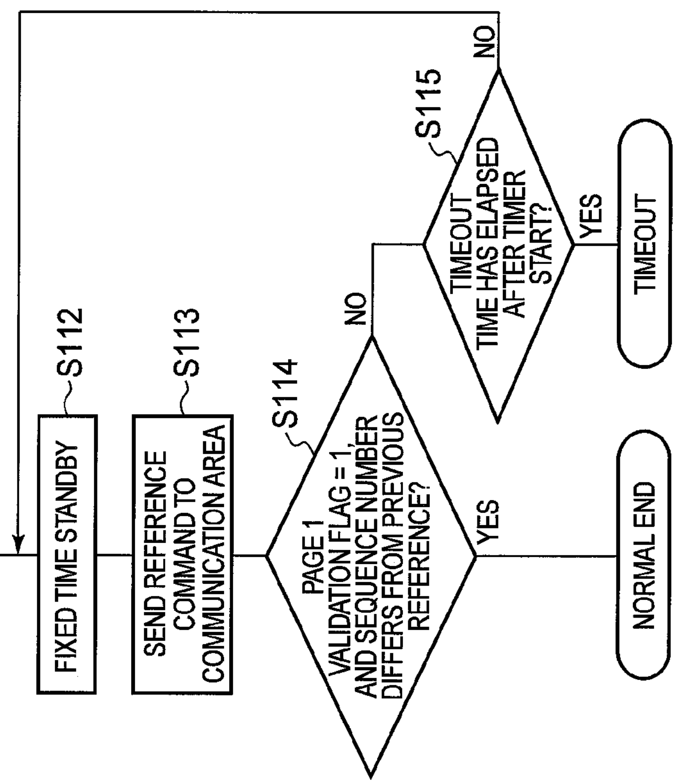
FIG. 5B shows a flowchart of the processing of a controller 120B (processor 112B) when a first storage system 920A sends a message to a second storage system 920B.
Figure 5C:
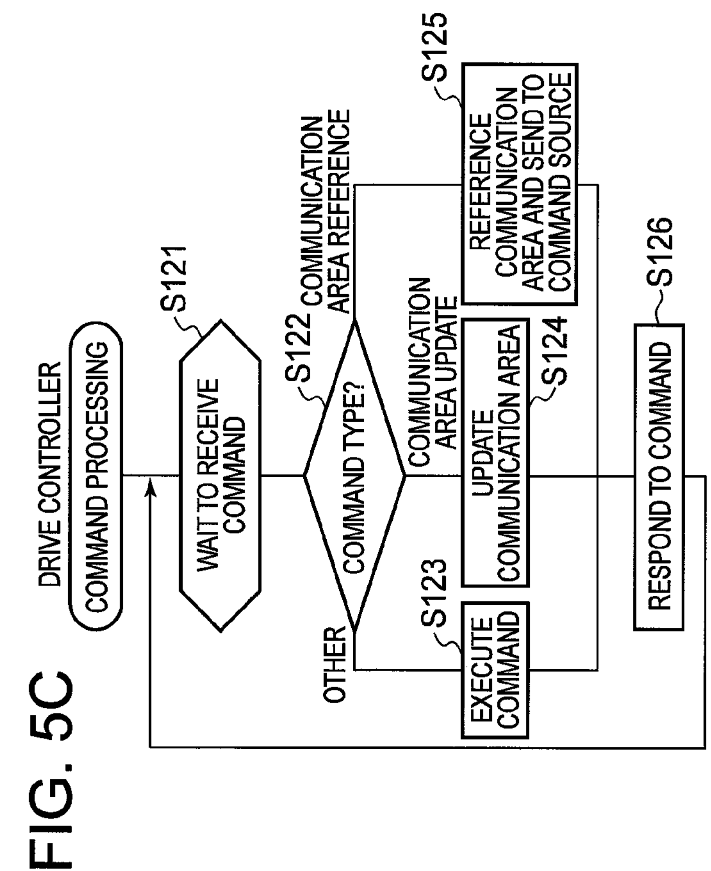
FIG. 5C shows a flowchart of the processing of a drive controller 303 (processor 301) when a first storage system 920A sends a message to a second storage system 920B.

FIG. 5A shows a flowchart of the processing of the controller 120A (processor 112A) when the first storage system 920A sends a message to the second storage system 920B. FIG. 5B shows a flowchart of the processing of the controller 120B (processor 112B) when the first storage system 920A sends a message to the second storage system 920B. FIG. 5C shows a flowchart of the processing of the drive controller 303 (processor 301) when the first storage system 920A sends a message to the second storage system 920B. Furthermore, a step is abbreviated as “S” in the figures.

The drive controller 303 to be used in communications between the storage systems 920A and 920B, for example, is set in advance by the controllers 120A and 120B and the drive controller 303, and the following processing is carried out in accordance with this setting. This setting, for example, can be recorded in the respective memories 105A, 105B and 185 of the controllers 120A, 120B and drive controller 303. For the below processing, it is supposed that the drive controller 303 utilized in communications is drive controller 303A.

As shown in FIG. 5A, controller 120A (processor 112A) sends an update command for updating the communications area 307A to first drive controller 303A (S101).

This processing can be executed by a dedicated program (not shown in the figure), it can be executed by any of the programs 132A, 134A and 136A described hereinabove, and it can be executed by a prescribed program from thereamong (for example, the data migration program 136A).

As shown in FIG. 5B, controller 120B (processor 112B) sets a timeout time, and starts a timer operation (time operation) (S111). The timeout time can be set to a value corresponding to a situation, or it can be a predetermined fixed value. Further, instead of a timeout time, a number of times (a polling frequency) for looping S112 and beyond can be set, and instead of a timer operation, the polling frequency can be counted.

The processor 112B, after standing by for a fixed time (S112), sends a reference command for referencing the communications area 307A to the first drive controller 303A (S113), and in response thereto receives various information recorded in the first channel area 951A (S114).

The processor 112B analyzes this information, and sets a validation flag (validation flag=1), and determines if the sequence number is different from the previous reference (S114). If the sequence number is different (S114: YES), the processor 112B ends processing as message reception successful, and if the sequence number is not different (S114: NO), checks if the timeout time subsequent to the commencement of the timer operation has elapsed (S115), and it this timeout time has not elapsed (S115: NO), returns to S112, and if the timeout time has elapsed (S115: YES), executes a timeout.

The above processing can be executed by a dedicated program (not shown in the figure), it can be executed by any of the programs 132B, 134B and 136B described hereinabove, and it can be executed by a prescribed program from thereamong (for example, the data migration program 136B).

Each step shown in FIG. 5C, for example, can be executed by the inter-storage communications program 305A of the first device controller 303A. When a command is received in wait to receive a command (S121), the inter-storage communications program 305A determines the command type (S122).

In S122, if the command is an update command for updating the communications area 307A, the inter-storage communications program 305A updates the first channel area 951A in accordance with this update command (S124), and sends a response relative to this update command (for example, updating complete) to the processor 112A (S126). The constitution can also be such that the channel area to be updated (first channel area 951A) is specified in the update command, and the inter-storage communications program 305A updates the information of the specified channel area, and if a channel area is not specified in the update command, the inter-storage communications program 305A selects the channel area corresponding to the source of the update command, and updates the information recorded in the selected channel area. This can be made the same for a reference in accordance with a reference command.

In S122, if the command is a reference command for referencing the communications area 307A, the inter-storage communications program 305A acquires information from the first channel area 951A in accordance with this reference command, and sends this information to the command issuer (processor 112B) (S125). Then, the inter-storage communications program 305A sends a response relative to this reference command (for example, referencing complete) to the processor 112B (S126).

In S122, if the command is another command besides an update command or a reference command for updating/referencing the communications area 307A, the processor 301A executes processing in accordance with the received command (S123), and returns a response relative to this command to the command source (S126). As this other command, for example, there are a command for acquiring the temperature inside the enclosure, a lock acquisition command, which will be explained below, and a lock release command.

According to the processing of FIG. 5A, FIG. 5B and FIG. 5C above, the controllers 120A and 120B can send and receive messages to and from one another. Furthermore, in this sending and receiving, a message and reference command from controller 120B, and a message provided to controller 120B go by way of the prescribed drive controller 303B, data migration port 601B, data migration cable 930 and data migration port 601A. More specifically, for example, information indicating that drive controller 303B, which is being used to send and receive messages, is drive controller 303A rather than itself is stored in the memory 185B of the prescribed drive controller 303B, and the inter-storage communications program 305B of this drive controller 303B recognizes this information. The controller 120B sends a communications area 307A reference command to the prescribed drive controller 303B. In this case, the inter-storage communications program 305B makes the above-mentioned recognition, and thereby transmits this reference command to the first data controller 303A via the data migration port 601B and data migration cable 930. Thus, the first drive controller 303A can receive the reference command sent by controller 120B. The inter-storage communications program 305A responds to this reference command, and can send a message recorded in the first channel area 951A to the drive controller 303B by way of the data migration port 601A and data migration cable 930. The inter-storage communications program 305B can transmit this received message to the controller 120B. Or, based on the information that the drive controller being used to send and receive a message is drive controller 303A, controller 120B can also communicate directly to drive controller 303A (More specifically, the controller 120B can issue a command, such as a reference command, to drive controller 303A by way of drive controller 303B.).

Further, according to the processing of FIG. 5A, FIG. 5B and FIG. 5C above, it is possible to achieve synchronization between controllers 120A and 120B. That is, for example, when a message having sequence number 1 is sent from controller 120A, controller 120B can operate without processing this sequence number 1 message a plurality of times. Further, as another method of achieving synchronization, for example, the message receiving side can set a flag indicating whether or not the message was referenced in the channel area in which this message is recorded, and the message sending side writes the next message if this flag is on (for example, if the flag is 1) but does not write the next message if this flag is off (for example, if the flag is 0).

With regard to a command between the controllers 120A and 120B and drive controller 303A, for example, there is a method that utilizes the Mode Select (update command)/ Mode Sense (reference command) of SCSI (More specifically, for example, there is a method, which uses a command that conforms to SES). By defining a mode page corresponding to the respective channel areas 951 and 953 of the communications area 307, it is possible to send and receive the contents of the channel areas 951 and 953 as mode parameters of these commands. It is possible to apply this method when using a standard that is compatible with SCSI (for example, Fibre Channel, SAS, iSCSI) as the I/F of a drive enclosure 160.

In the example described hereinabove, the working example is explained using an example of when the first storage system 920A sends a message to the second storage system 920B, but when the second storage system 920B sends a message to the first storage system 920A, the second channel area 953A is used.

There are a plurality of drive controllers 303 inside the respective storage systems 920A and 920B, and the drive controller for use in communications between storage systems 920A and 920B can be preset as explained hereinabove. Further, a communications area 307 need not be provided in all the drive controllers 303, but instead can be provided in at least one drive controller 303. A communications area 307 can be provided in any drive controller 303 (For example, a communications area 307 can be in the drive controller of the drive that is furthest upstream of a plurality of drives.). The above holds true for the data migration ports 601 as well.

The processes executed when the first drive controller 303A (processor 301A) receives a lock acquisition command and a lock release command, respectively, will be explained below by referring to FIGS. 6A and 6B. In this explanation, it is supposed that controller 120B sends a lock acquisition command and a lock release command to prohibit the updating of configuration information 172A by controller 120A, and to release this prohibition.

Figure 6B:
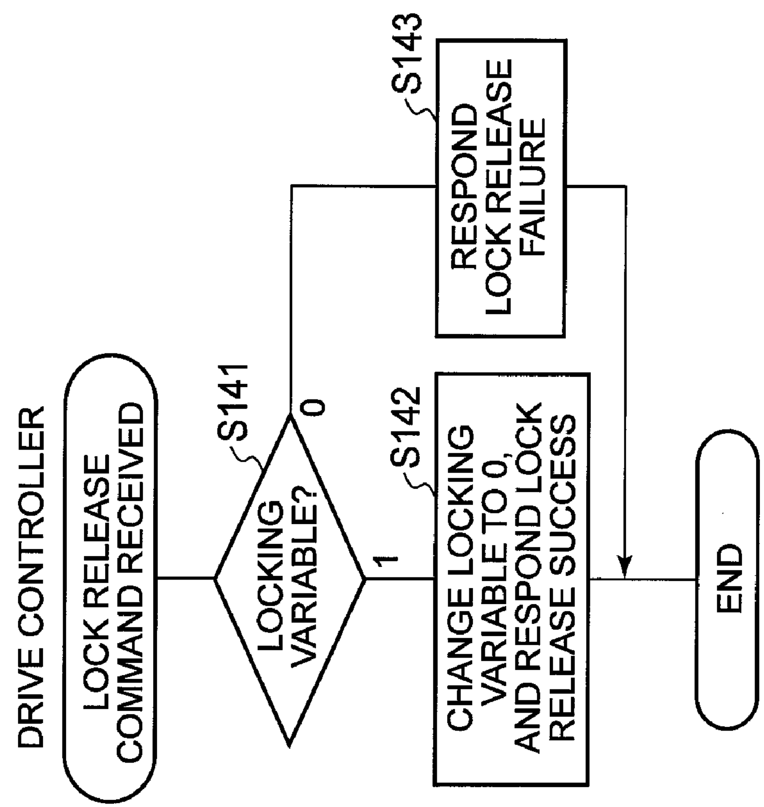
FIG. 6B shows a flowchart of processing executed in S123 of FIG. 5C when a first drive controller 303A (processor 301A) receives a lock release command.
Figure 6A:
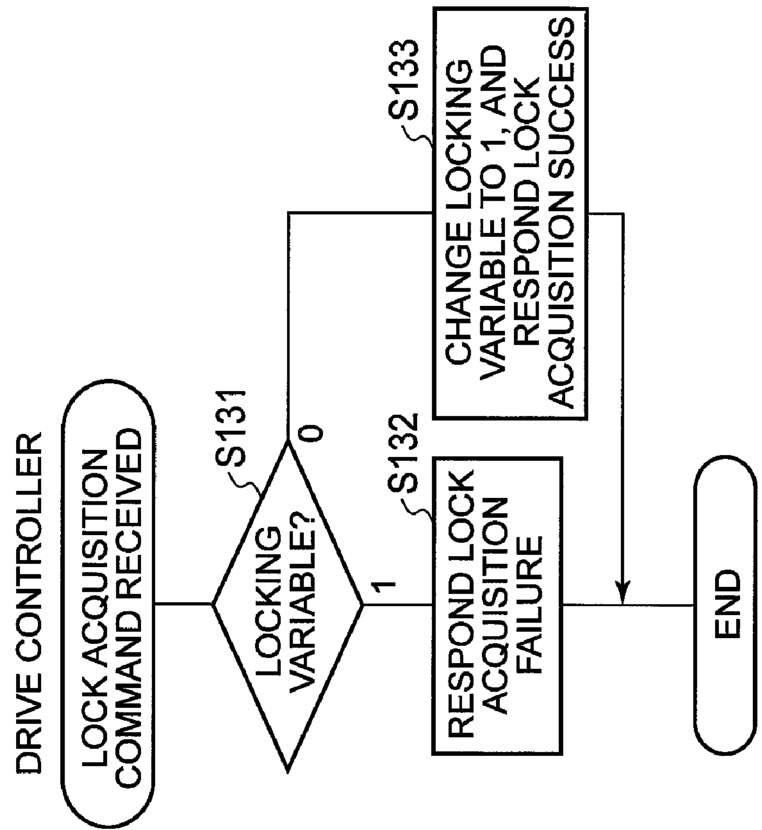
FIG. 6A shows a flowchart of processing executed in S123 of FIG. 5C when a first drive controller 303A (processor 301A) receives a lock acquisition command.

FIG. 6A shows a flowchart of processing executed in S123 of FIG. 5C when the first drive controller 303A (processor 301A) receives a lock acquisition command.

Upon receiving a lock acquisition command from controller 120A, the processor 301A references the first channel area 951A, and checks the locking variable (S131) As a result, if the locking variable is 1, the processor 301A responds to controller 120A that lock acquisition failed (S132). Conversely, if the locking variable is 0, the processor 301A changes this locking variable to 1, and responds to controller 120A that lock acquisition succeeded (S133).

FIG. 6B shows a flowchart of processing executed in S123 of FIG. 5C when the first drive controller 303A (processor 301A) receives a lock release command.

Upon receiving a lock release command from controller 120A, the processor 301A references the first channel area 951A, and checks the locking variable (S141). As a result, if the locking variable is 1, the processor 301A changes this locking variable to 0, and responds to controller 120A that lock acquisition succeeded (S142). Conversely, if the locking variable is 0, the processor 301A responds to controller 120A that lock release failed (S143).

The condition determinations (S131 and S141), and the changing of the locking variables (S133 and S143) in FIGS. 6A and 6B must be executed atomically (inseparably) to prevent a conflict, such as a lock being acquired simultaneously by two controllers 120.

Now then, in this working example, in order to replace a storage system, for example, the data of the old (existing) first storage system 920A is migrated to a new (unused) second storage system 920B. For this purpose, the second storage system 920B is connected to the first storage system 920A.

FIG. 8 shows a flowchart of processing executed when first drive controllers 303A and 303B are connected via a data migration cable 930.

The first storage system 920A, which is in operation, is waiting for an event to occur (S151).

In S152, a person (for example, a maintenance person) connects the data migration cable 930, which is connected to data migration port 601A of the first storage system 920A, to data migration port 601B of the second storage system 920B, and thereafter, the power to the second storage system. 920B is turned ON. Thereafter, the second storage system 920B waits to receive a notification (S153). More specifically, for example, the controller 120B polls (regularly issues reference commands) to the first channel area 951A of the communications area 307.

According to S152, for example, a prescribed electric signal from the data migration port 601A is inputted to the device manager 300A, and the device manager 300A detects that the second storage system 920B is connected via the data migration port 601A. The device management program 304A reports the fact that the device manager 300A made this kind of detection (that is, the fact that the second storage system 920B is connected) to controller 120A.

In S154, controller 120A responds to this report by sending a message indicating the status (hereinafter, a status message) to the second storage system 920B. At this time, controller 120A can write a message indicating, the status to the first channel area 951A of the communications area 307A.

In S155, controller 120B determines whether or not the first storage system 920A is operating normally. Here, for example, controller 120B can determine that operation is normal when it acquires the status message, and this status message indicates normal (S155: YES). Conversely, when the status message does not indicate normal, or when timeout occurs without being able to reference the status message, controller 120B can make the determination that operation is not normal (S155: NO). When S155 is YES, processing ends, and when S155 is NO, processing proceeds to S156.

In S156, controller 120B executes HDD discovery in the first storage system 920A. More specifically, for example, controller 120B sends a prescribed reference command for checking the HDD 12A that exist in the first storage system 920A to the first drive controller 303A. Accordingly, all the HDD 12A subordinate to the first storage system 920A become subordinate to the second storage system 920B. In other words, ownership of all the HDD 12A transfers from the first storage system 920A to the second storage system 920A.

In S157, configuration information 172A is read out from the system area 190A (refer to FIG. 3), and is merged (added) to configuration information 172B. More specifically, for example, the configuration management program 134B of controller 120B sends a read command for referencing configuration information 172A to the first drive controller 303A. For example, the location of the configuration information 172A (for example, the location specified by the HDD discovery of S156) is specified in this read command. The inter-storage communications program 305A of the first drive controller 303A responds to this read command, acquires the configuration information 172A from the HDD 12A, and sends the acquired configuration information 172A to controller 120B. The configuration management program 134B adds the information recorded in configuration information 172A to configuration information 172B. Configuration information 172A can be deleted from the system area 190A at this time.

According to the above-described process, when the first drive controllers 303A and 303B are connected at the back-end via the data migration cable 930, controller 120B can determine the status of controller 120A, and when controller 120A is determined not to be normal, controller 120B automatically acquires ownership of the HDD and LU of the first storage system 920A.

Figure 9:
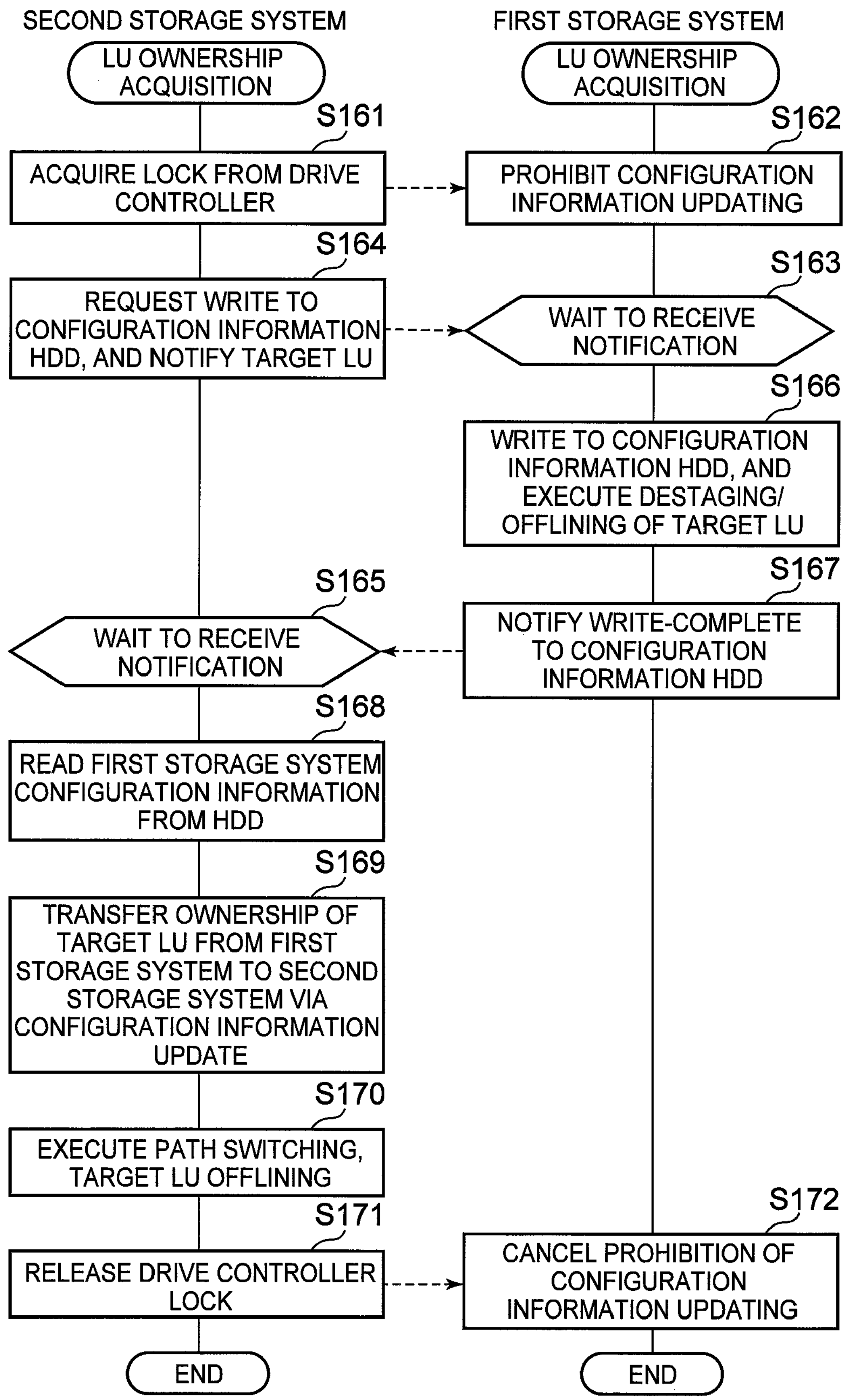
FIG. 9 is a flowchart of processing for transferring LU ownership from the first storage system 920A to the second storage system 920B.

FIG. 9 is a flowchart of processing for transferring LU ownership from the first storage system 920A to the second storage system 920B.

This process, for example, is executed when controller 120A is normal, but ownership of a portion of the LU of the plurality of LU in the first storage system 920A is transferred. The advantage of this process, for example, is that the load of controller 120A is distributed to controller 120B. Further, this process can also be used at the data migration of a target LU. In this process, it is supposed that ownership of LU of internal LUN 4 in the first storage system 920A is transferred. Making the LU of internal LUN 4 the target can be specified, for example, from the management terminal 198.

Controller 120B sends a lock acquisition command to the first drive controller 303A (S161). The inter-storage communications program 305A acquires a lock (makes the locking variable 1) (S162), thereby creating a state wherein updating of configuration information 172A is prohibited. More specifically, even if controller 120A requests the updating of configuration information 172A, in response to this request, the inter-storage communications program 305A returns a message to controller 120A indicating that configuration information 172A is under exclusive control, thereby making it impossible for configuration information 172A to be updated. Subsequent to S162, controller 120A waits to receive a notification, for example, transitioning to a state wherein it regularly sends reference commands to the communications area 307A (S163)

Controller 120B writes a message to the communications area 307A requesting that configuration information 172A be written to an HDD 12A, and notifying the target LU (the LU of LUN 4, which is the target of LU ownership migration) (S164). It is requested that configuration information 172A be written out to a HDD 12A here because there are cases in which the configuration information 172A is read out to the memory 105A of controller 120A, and referenced or updated in this memory 105A. Therefore, this kind of request is not necessary when the configuration information 172A is not capable of being updated in memory 105A. Subsequent to S164, controller 120B waits to receive a notification, for example, transitioning to a state wherein it regularly sends reference commands to the communications area 307A (S165).

In S166, controller 120A responds to the message written in S164, writes the configuration information 172A to a HDD 12A (writes it to the system area 190A), and destages/offlines the target LU. Destage here refers to writing to the target LU from the cache area 150A data that is not reflected in the target LU from among the data that exists in the cache area 150A. Further, offline here refers to cutting the connection between the target LU and the host computer that is allowed to access this target LU (the host computer identified from the allocated host ID, hereinafter, the target host). Once the writing of the configuration information 172A to the HDD 12A is complete, controller 120A writes a message indicating the completion thereof to the communications area 307A (S167).

In S168, controller 120B responds to the message written in S167, and sends a read command to the HDD 12A for reading the configuration information 172A.

In S169, controller 120B transfers ownership of the target LU by updating configuration information 172A and 172B. More specifically, as shown in FIG. 10A, controller 120B deletes the row comprising internal LUN 4 from LU configuration management table 1100A, and, as shown in FIG. 10B, adds this deleted row to LU configuration management table 1100B.

In S170, controller 120B carries out path switching, and brings the target LU online. More specifically, for example, controller 120B sets the IP address and so forth of the host I/F 114A, to which internal LUN 4 is allocated, in an offline host I/F 114B in which an IP address and so forth has not been set, and brings this host I/F 114B online. As path switching methods for the target LU, there is, in addition to IP address takeover, a method for changing the IP address for accessing the target LU by updating the iSNS (Internet Storage Name Server) or changing the setting inside the host 192.

In S171, controller 120B sends a lock release command to the first drive controller 303A. The inter-storage communications program 305A cancels the prohibition on updating configuration information 172A by releasing the lock (making the locking variable 0) (S172).

The preceding is the process for transferring LU ownership. Prior to carrying out S170, when the target host specifies an IP address for accessing the target LU and sends an input/output request, controller 120A receives this input/output request, but subsequent to carrying out S170, controller 120B receives this input/output request. Accordingly, it is possible to change the destination of an input/output request for the target LU from the first storage system 920A to the second storage system 920B without stopping an input/output request from the target host. Furthermore, when the host I/F 114A and 114B are Fibre Channel, instead of carrying out IP address takeover, controller 120A can stop receiving input/output requests for the target LU, and controller 120B can start receiving input/output requests for the target LU.

Further, subsequent to carrying out S170, when controller 120B receives an input/output request for the target LU inside the first storage system 920A, for example, this input/output request can be transmitted to the first storage system 920A in accordance with the following processing. That is, controller 120B specifies the internal LUN 4 corresponding to the host LUN specified by this input/output request, and references the physical location corresponding to this internal LUN 4. When this physical location represents a subsystem 1, controller 120B sends a write command/read command for the HDD 12A corresponding to this internal LUN 4 to this HDD 12A by way of the first drive controller 303A. Accordingly, controller 120B can write or read data in accordance with this input/output request to the target LU of the first storage system 920A.

FIG. 11 is a flowchart of processing for the second storage system 920B to set a LU subordinate to itself in a free portion of user volume area 501A of the first storage system 920A.

This process, for example, can be started in accordance with the management terminal 198 instructing controller 120B to create a new LU. Required information, such as whether or not the LU will be created in an existing RAID group (RG), and the RAID group at which RAID level is to be created, can set in the new LU creation instruction.

Approximately the same processing as S161 to S167 is carried out (S181 to S187). Unlike the transfer of LU ownership, there is no need to carry out a target LU notification, or to destage/offline the target LU.

In S188, controller 120B sends a read command for reading out configuration information 172A to the HDD 12A by way of the first drive controller 303A, thereby acquiring the configuration information 172A.

When controller 120B creates a LU in an existing RAID group (RG), processing proceeds to S190, and when controller 120B creates a LU by creating a new RAID group, processing proceeds to S191.

In S190, a LU is created in an existing RAID group inside the first storage system 920A by updating configuration information 172A and 172B, and ownership of this LU is set in the second storage system 920B. More specifically, as shown in FIG. 12A, RAID group 2 is selected, a LU of internal LUN 0 is created in this RAID group 2, and information relevant to this LU is added to LU configuration management table 1100B. Furthermore, the reason for selecting RAID group 2 is because it was the RAID level specified in the above-mentioned new LU creation instruction, and because it has free capacity of greater than the capacity specified in this new LU creation instruction. The free capacity of the respective RAID groups can be specified by referencing the LU allocated area. Further, a required location of the configuration information 172A is updated in line with this processing. More specifically, for example, the LU allocated area corresponding to RAID group ID2 of the RAID group management table 1300A is updated.

In S191, a new RAID group and LU are created in the first storage system 920A by updating configuration information 172A and 172B, and ownership of this LU is set in the second storage system 920B. More specifically, as shown in FIG. 12B, RAID group 5 is newly created, a LU of internal LUN 0 is created in this RAID group 5, and information relevant to this LU is added to LU configuration management table 1100B. Furthermore, RAID group 5, for example, can be created when the number of unused HDD 12A corresponds to the specified RAID level. An unused HDD 12A, for example, can be specified from the HDD configuration of RAID group management table 1300A. For example, when there is a missing HDD number in a prescribed range of HDD numbers, a determination can be made that this HDD number is not being used. In this S191, a required location of the configuration information 172A is once again updated. More specifically, for example, a new row corresponding to RAID group ID5 is added to the RAID group management table 1300A.

After S190 and S191 have ended, the same processing as in S171 and S172 of FIG. 10 is performed (S192 and S193).

FIG. 13 is a flowchart of processing executed when all the data inside the first storage system 920A migrates to the second storage system 920B.

This process, for example, can be automatically carried out subsequent to the back-end connection being made between first drive controllers 303A and 303B, and can also be carried out in accordance with an instruction from the management terminal 198. The management terminal 198 can send a total data migration instruction to both controllers 120A and 120B.

In S201, controller 120A determines whether or not there is authorization for a data migration from a user. When authorization exists, processing proceeds to S204. Furthermore, “user data migration authorization” can be carried out from the management terminal 198. The purpose of performing this step, for example, is as a security measure to prevent data leakage resulting from an unauthorized data migration. If security is not a problem, then this step can be eliminated.

In S204, controller 120A writes a message to the communication area 307A notifying of authorization to migrate data (hereinafter, migration authorization message). Thereafter, controller 120A waits for a request to takeover all LU (S205).

S201 to S204 above need not be executed when controller 120A is not operating normally.

In S202, controller 120B determines the status of controller 920A. More specifically, for example, controller 120B writes a message to the communications area 307A inquiring as to the status of controller 120A, and thereafter, polls the communications area 307A (waits for a status message). When a status message is acquired, the status of controller 120A is determined from this status message. When controller 120A is determined to be normal (S202: YES), processing proceeds to S203 (execution of polling to wait for a migration authorization message), and if a migration authorization message is acquired in S203, processing proceeds to S206. When controller 120A is determined not to be normal, or when a timeout occurs (S202: NO), processing proceeds to S206.

In S206, controller 120B determines if there is the HDD capacity needed for data migration. More specifically, for example, controller 120B acquires configuration information 172A, and determines from the configuration information 172A whether or not the storage capacity of more than the total capacity of all LU in the first storage system 920A is greater than the unused storage capacity of the second storage system 920B (the storage capacity capable of being specified from configuration information 172B). If it is not, processing proceeds to S207 and data migration is cancelled, and if it is, processing proceeds to S206A.

In S206A, controller 120B determines whether or not controller 120A is normal. The same processing as that of S202 can be carried out once again here, and the determination results of S202 can be inherited. If the result of S206A is YES, processing proceeds to S208, and if the result of S206A is NO, processing proceeds to S212.

In S208, controller 120B writes a message to the communications area 307A requesting takeover of all LU. Then, controller 120B waits to receive a notification (for example, the polling execution status of communications area 307A) (S209).

In S210, controller 120A, for example, acquires from the communications area 307A the message requesting the takeover of all LU by performing polling in S205. In response thereto, controller 120A sets all host I/F 114A offline (for example, severs communications), destages/offlines all LU (for example, makes all LU exclusive), executes a write to the HDD 12A of configuration information 172A, and writes a message indicating the completion of this processing (hereinafter, S210-complete message) to the communications area 307A.

In S211, the operation of controller 120A stops, either automatically subsequent to S210, or as a result of the below-described stop processing in S212.

In S212, controller 120B can execute the following processing thanks, for example, to acquiring the S210-complete message via the polling in S209, and to the fact that S206A resulted in NO. That is, controller 120B specifies the IP addresses of the respective host I/F 114A from the port management table 1200A in the configuration information 172A, and sets the respective IP addresses in host I/F 114B. In other words, the IP addresses of the respective host I/F 114A are taken over by the respective host I/F 114B. Furthermore, in this S212, for example, when the result of S206A was NO, processing for completely stopping controller 120A (stop processing) can be executed. For example, controller 120B can send a stop command for stopping controller 120A to the first drive controller 303A, and the processor 301A of the first drive controller 303A can stop the processor 112A of controller 120A by virtue of an interrupt.

In S213, controller 120B notifies the host computer 192 of the IP addresses of the respective host I/F 114B.

In S214, controller 120B starts receiving the input/output requests from the host computer 192 for all the migration-source LU in the first storage system 920A. Thereafter, controller 120B executes data copying in S220.

FIG. 14 is a flowchart of the data copying of S220 of FIG. 13.

In S221, controller 120B, based on configuration information 172A, creates a user volume area 501B of the same configuration as the user volume area 501A of the first storage system 920A.

More specifically, for example, controller 120B copies all the rows constituting LU configuration management table 1100A to LU configuration management table 1100B as shown in the example in FIG. 15. Accordingly, LU ownership of internal LUN 0 to 4 (migration-sources LU 0 to 4) is transferred to the second storage system 920B. Thus, controller 120B can receive and process input/output requests for migration-source LU 0 to 4.

Furthermore, controller 120B adds the respective rows corresponding to the copied rows to LU configuration management table 1100B. More specifically, rows respectively comprising internal LUN 5 through 9 corresponding respectively to internal LUN 0 through 4 are added. The capacity and RAID group ID are respectively copied in each added row. Accordingly, migration-destination LU 5 to 9 corresponding respectively to all the migration-source LU 0 to 4 in the first storage system 920A are created in the second storage system 920B. Furthermore, columns called migration-source LUN and migration status are added to the LU configuration management table 1100B at data migration (These columns can also be provided in advance.). A migration-source LUN is an internal LUN of a migration-source LU. The fact that the migration-source LUN corresponding respectively to internal LUN 5 to 9 are numbered 0 to 4 makes it clear that the migration-source LU corresponding respectively to the migration-destination LU 5 to 9 are numbered 0 to 4. Further, migration status represents the status related to migration. This status is one of three types: "incomplete" (migration has not been carried out yet), "migrating" (in the process of copying the data), and "complete" (data copying is over).

Refer to FIG. 14 once again. In S222, controller 120B determines if all LU copying was completed. This determination can be made, for example, based on whether or not all the migration statuses of the LU configuration management table 1100B are "complete". If all the migration statuses are complete, processing moves to S223, and if all the migration statuses are not complete, processing moves to S224.

In S223, controller 120B destroys the data of all the LU (migration-source LU 0 to 4) of the first storage system 920A. Accordingly, all data migration is complete. That is, in this working example, for a data migration between LU (migration), it is possible to end data migration by destroying the data inside a migration-source (copy source) LU subsequent to copying the data between the LU.

In S224, controller 120B selects one migration-source LU from a group of migration-source LU for which copying is not yet complete, and commences copying to a migration-destination LU corresponding to this selected migration-source LU. More specifically, as shown in the example in FIG. 16, for example, controller 120B selects migration-source LU 2, changes the migration status corresponding to the migration-source LU 2 from "incomplete" to "migrating", and executes data copying to migration-destination LU 7 from migration-source LU 2. Once this data copying has ended, controller 120B changes this migration status from "migrating" to "complete".

In S225, subsequent to completion of this copying, controller 120B changes the host access destination to the migration-destination LU. More specifically, as shown in the example in FIG. 17, for example, controller 120B makes the allocated host ID and host LUN, which correspond to migration-source LU 2, correspondent to migration-destination LU 7, and deletes this allocated host ID and host LUN from the row of migration-source LU 2. Further, controller 120B also deletes migration-source LUN 2 corresponding to migration-destination LU 7. However, changing the host access destination to the migration-destination LU can also be done subsequent to completing the copying of data to all the LU (after S222). In this case, a write from a host to a LU to which copying was completed is reflected in both the migration-source and migration-destination LU prior to data copying being completed for all LU. Opting for the latter system is less advantageous than the former system from the standpoint of performance, but it enables the latest data to be saved in the first storage system 920A, making it possible to continue working by returning the access path to the first storage system 920A when it becomes impossible to continue migration due to a failure or the like during migration.

Repeating S224 and S225 completes data copying from all migration-source LU to all migration-destination LU, and LU configuration management table 1100B becomes like the example shown in FIG. 17.

The preceding is an explanation of total data migration processing. Furthermore, the data copying in S224, for example, can be carried out by a flow of processes such as the following. For example, the data migration program 136B reads data from the selected migration-source LU, writes this data temporarily to the cache area 150B, and then reads this data from the cache area 150B, and writes this data to the migration-destination LU. Instead of this method, for example, the data migration program 136B can also carry out data copying by setting the physical migration-source location (for example, the HDD number and address range), where the migration-source LU data exists, in first drive controller 303A, setting the physical address (for example, the HDD number and address range) corresponding to the migration-destination LU in first drive controller 303A, having first drive controller 303A read the data from the migration-source location and transmit same to first drive controller 303B, and having first drive controller 303B store the transmitted data in the migration-destination location. In other words, in a data migration, data targeted for migration can be written to a migration-destination LU subsequent to being temporarily written to the cache area 150 of controller 120B, and data migration can also be carried out without writing the data to the cache area 150.

The preceding is an explanation of the first working example. Furthermore, the operation of controller 120B, which was explained by referring to FIGS. 13 and 14, is carried out by the data migration program 136B. Further, in total data migration processing, data copying can commence after a lock is acquired by controller 120B. Furthermore, as for a back-end connection (connection between the data migration ports 601A and 601B), back-end data migration, and host access path switching, for example, the processing disclosed in Patent Application No. 2006-278237 (This application was not laid open to the public at the time of application.) can be cited as needed.

According to this first working example, data migration ports 601A and 601B are connected respectively to first drive controllers 303A and 303B, and these data migration ports 601A and 601B are connected by a data migration cable 930. In a data migration, data flows from the migration-source LU to first drive controller 303A, data migration port 601A, data migration cable 930, data migration port 601B, drive controller 303B and the migration-destination LU, without going through controller 120A of the migration-source storage system 920A. Accordingly, the migration of data is possible even when controller 120A is inoperable.

Further, in this first working example, a communications area 307, which is a shared memory, is provided in the drive controller 303 by way of which data flows in a data migration, and an inter-storage communications program 305 is installed in the drive controller 303. This inter-storage communications program 305 is configured so as to be able to receive and process commands from controllers 120A and 120B for referencing and updating this communications area 307. Accordingly, it becomes possible to send and receive messages between controllers 120A and 120B, which make use of the storage resources of the back-end drive controllers 303.

Further, in this first working example, when locking information for exclusive control is recorded in the communications area 307A, and a lock is acquired, the updating of a prescribed resource (for example, configuration information 172A or a LU) inside the first storage system 920A is prohibited. Accordingly, for example, when data migration and/or LU ownership transfer is executed online (while receiving input/output commands from a host computer 192), this execution can be carried out safely without destroying the configuration of the migration-source. This mechanism is valid when controller 120A is normal in particular.

Further, in this first working example, since each controller 120 can communicate with the drive controller 303 in the other storage system even when the other controller 120 is not operating normally, configuration information 172 in the other storage system 920 can be referenced and updated. Accordingly, ownership of the LU of the other storage system 920 can be acquired even if the other controller 120 is inoperable.

Second Working Example

A second working example of the present invention will be explained below. The points of difference with the first working example will mainly be explained at this time, and explanations of the points in common with the first working example will either be simplified or omitted.

In the first working example, during data migration, controller 120B receives an input/output request, and the data conforming to this input/output request goes through the data migration cable 930 until access from the host is switched to the migration-destination LU. Since data also goes by way of this cable 930 during a data migration, the bandwidth of the cable 930 becomes constricted.

Accordingly, in the second working example, an input/output request is received and processed by controller 120A. In accordance therewith, data conforming to the input/output request does not go by way of the data migration cable 930, thereby making it possible to relieve the communication burden placed on the cable 930.

Figure 18:
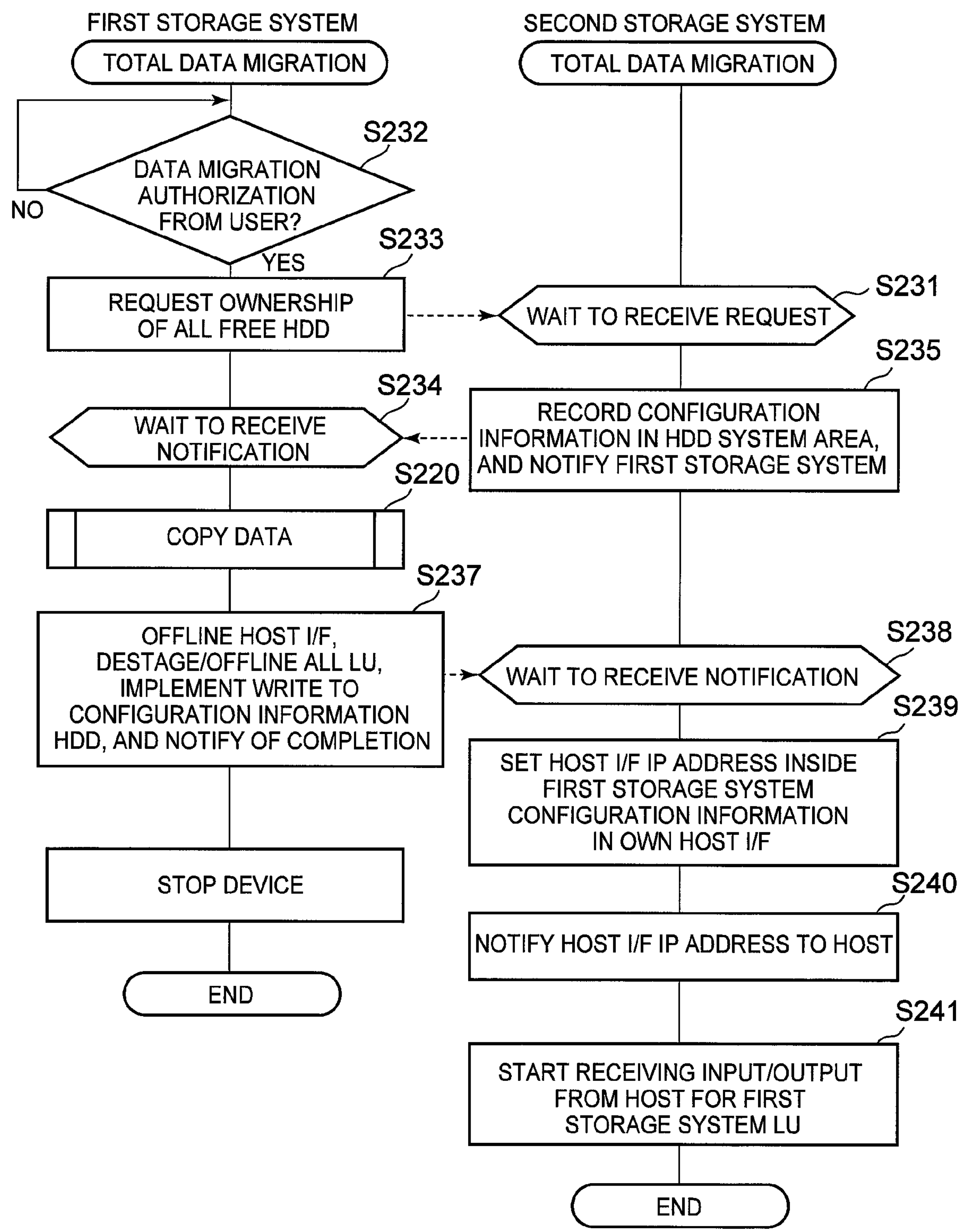
FIG. 18 shows an example of total LU data migration processing carried out by a second working example of the present invention.

More specifically, when controller 120A is determined to be normal, the total data migration processing of FIG. 18 is executed instead of that of FIG. 13. This will be explained in detail hereinbelow. Furthermore, the same holds true for the first working example, but the data migration program 136 can execute the operation executed by the controller 120 involved in a data migration.

Controller 120B waits to receive a request, for example, it polls the communications area 307A (S231).

When there is data migration authorization from the user (S232: YES), controller 120A writes a message to the communications area 307A requesting ownership of all free HDD (S233). Then, controller 120A waits to receive a notification, for example, it polls the communications area 307A (S234).

Upon acquiring this message, controller 120B responds to this message, writes configuration information 172B to system area 190B (HDD 12B), and writes a message to the communications area 307A indicating the completion thereof (S235). Then, controller 120B waits to receive a communication (S238).

Upon acquiring this message by waiting in S234, controller 120A executes data copying (S220). The details of the processing of S220 are as shown in FIG. 14. In this processing, either controller 120A or 120B can carry out data migration.

Subsequent to the end of S220, the same processing as that of S210 to S214 of FIG. 13 is executed (S237 to S241).

The preceding is an explanation of the second working example.

Third Working Example

Figure 19:
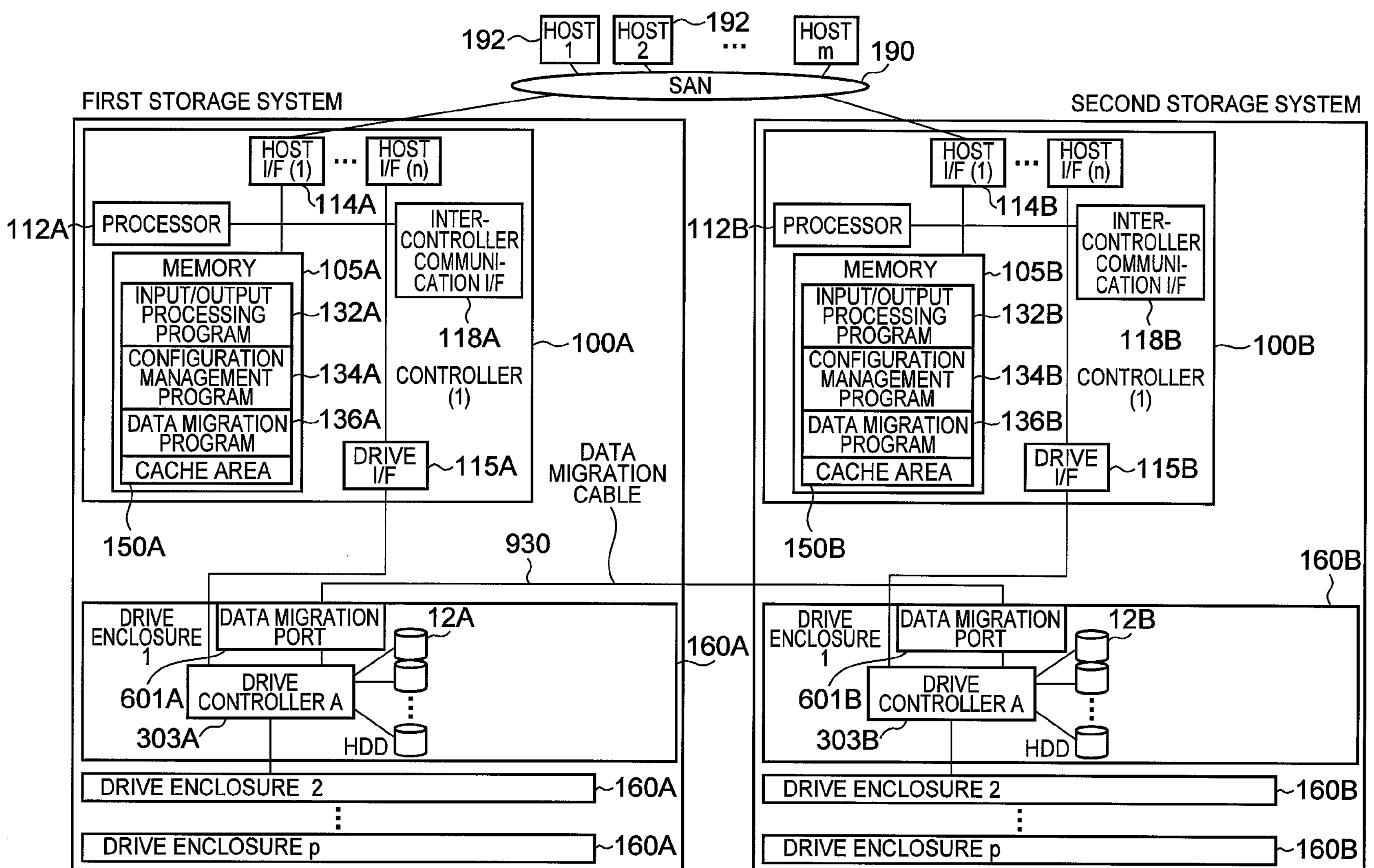
FIG. 19 shows a block diagram of a computer system related to a third working example of the present invention.

FIG. 19 shows a block diagram of a computer system related to a third working example of the present invention.

Controllers 120A and 120B in the respective storage systems 920A and 920B are not redundant. Therefore, when a failure occurs in controller 120A, there is no element to operate in its place, but nevertheless, convenience is maintained since the above-described data migration is possible if controller 120B and the first drive controllers 303A and 303B are normal.

Furthermore, in this third working example, the data migration cable 930 and data migration ports 601A and 601B are not redundant, but they can be made redundant. By so doing, even if a failure occurs in the one cable 930, and either data migration port 601A or data migration port 601B, data migration can be carried out via the other cable 930, and either data migration port 601A or data migration port 601B.

The embodiment and a number of working examples of the present invention have been explained hereinabove, but this embodiment and these working examples are merely illustrations for explaining the present invention, and the scope of the present invention is not restricted to this embodiment and these working examples alone. The present invention can be put into practice in a variety of other modes without departing from the gist thereof.

For example, data copying in LU units and the transfer of LU ownership can be executed alternately.

Further, the decision to make one storage system the migration-source and to make the other storage system the migration-destination can be made manually by a user, or it can be decided automatically. A method for deciding automatically, for example, is as follows. That is, because storage system 920A is operating alone at first, there is nothing connected to the other end of the data migration port 601A, and as a result, even if controller 120A detects drive controller 303A, it does not detect any device at the other end of the data migration port 601A. Thus, when only one drive controller 303A can be detected, controller 120A can make the determination that this storage system 920A is the storage system of the migration-source. Conversely, it is supposed that storage system 920B will start up in a state in which drive controller 303A is connected to data migration port 601B via a data migration cable. This being the case, controller 120B can detect drive controller 303A in addition to drive controller 303B. Thus, when both drive controllers 303A and 303B are detected, controller 120B can determine that this storage system 920B is the storage system of the migration-destination, and can determine that the other storage system 920A is the storage system of the migration-source. Thus, when there is a difference in the startup times of the storage systems 920A and 920B, a determination can be made automatically from the above-mentioned flow. Furthermore, when there is no difference in the startup times of the storage systems 920A and 920B, the migration-source and migration-destination can be specified to the respective controllers 120A and 120B from the management terminal.

Further, for example, the drive controller used in communications can be switched automatically. More specifically, for example, a setting, which determines in advance that "303A of the drive controller A, to which the controller (1) 120A of the migration-source storage system 920A is connected, will be used", is made in the respective controllers 120A and 120B. If a failure occurs in the predetermined drive controller 303A, a communication is attempted using the next candidate drive controller based on a predetermined candidate search order (for example, drive controller A of the migration-source subsystem→drive controller A of the migration-destination subsystem→drive controller B of the migration-source subsystem→drive controller B of the migration-destination subsystem), and once a drive controller capable of communication is detected, it is possible to continue communications between the controllers 120A and 120B via this drive controller.

What is claimed is:

1. A storage system which is a second storage system that is coupled to a first storage system, said first storage system having a first controller, a plurality of first storage devices which form a plurality of first logical volumes, a first switching apparatus interposed between said first controller and said plurality of first storage devices, a first front-end port for receiving an input/output request from a first upper level device, and a first back-end communication port which differs from said first front-end communication port, wherein said first controller receives an input/output request sent from said first upper-level device, and, in accordance with the received input/output request, carries out a data write and/or read to any one of said plurality of first storage devices via said first switching apparatus, said storage system comprising:

a second controller;

a plurality of second storage devices;

a second front-end communication port for receiving an input/output request from a second upper-level device;

a second back-end communication port which differs from said second front-end communication port;

a second switching apparatus interposed between said second controller and said plurality of second storage devices and connected to said first switching apparatus via said second and first back-end communication ports;

wherein said second controller receives an input/output request sent from said first and/or said second upper-level device, and, in accordance with the received input/output request, carries out a data write and/or read to any one of said plurality of second storage devices via said second switching apparatus, wherein said second controller prepares as copying destinations a plurality of second logical volumes corresponding respectively to said plurality of first logical volumes, wherein said second controller carries out copy of data between at least one of said plurality of first storage devices and at least one of said plurality of second storage devices by way of said first switching apparatus, said first back-end communication port, said second back-end communication port and said second switching apparatus, without going through said first controller, and wherein said second controller deletes data stored in said plurality of first logical volumes when the copy of data from said plurality of first logical volumes to said plurality of second logical volumes has ended.

2. The storage system according to claim 1, wherein said first switching apparatus comprises a first shared memory, and said second switching apparatus comprises a second shared memory; and wherein said second controller mutually communicates with said first controller via said first shared memory when said at least one of the first logical volumes is the copy source.

3. The storage system according to claim 2, wherein a first sub-area and a second sub-area are respectively included in said first and second shared memories, and said second controller writes to said first sub-area when writing a message to said first controller, and reads from said second sub-area when reading a message from said first controller.

4. The storage system according to claim 1, wherein said first storage system comprises a first configuration information storage area for storing first volume configuration information for managing information related to each of said plurality of first logical volumes, said first controller executes processing in accordance with an input/output request from said first upper-level device based on said first volume configuration information, and said second controller accesses said first volume configuration information either by issuing an access command for accessing said first volume configuration information to a storage device connected to said first switching apparatus, or by issuing a command for acquiring said first volume configuration information to said first controller by way of said first switching apparatus.

5. The storage system according to claim 4, wherein said second storage system comprises a second configuration information storage area for storing second volume configuration information, both said first and second volume configuration information comprise information indicating which logical volume exists in which storage system, and said second controller executes processing in accordance with an input/output request from said second upper-level device based on said second volume configuration information, and said second controller takes over from said first storage system access ownership for executing the input/output of data to either a portion or all of said plurality of first logical volumes by invalidating information related to either a portion or all of a first logical volume of said plurality of first logical volumes, and validating information related to this either a portion or all of a first logical volume using said second volume configuration information, either by issuing an access command to a storage device connected to said first switching apparatus, or by issuing a prescribed command to said first controller via said first switching apparatus.

6. The storage system according to claim 5, wherein said first controller does not update said first volume configuration information when a lock is set in said first shared memory; and said second controller sets a lock in said first shared memory prior to issuing said access command to said first switching apparatus.

7. The storage system according to claim 5, wherein said second controller, by executing takeover of said access ownership, receives an input/output request for said a portion or all of a first logical volume, and upon receiving this input/output request, carries out inputting/outputting of data to said first logical volume by way of said second switching apparatus, said second back-end communication port, said first back-end communication port, and said first switching apparatus.

8. The storage system according to claim 7, wherein said second controller determines whether or not said first controller is normal, and when said second controller determines that said first controller is not normal, said second controller executes takeover of said access ownership, and when said second controller determines that said first controller is normal, said second controller does not execute takeover of said access ownership.

9. The storage system according to claim 7, wherein said second controller executes takeover of said access ownership prior to commencing said copying.

10. The storage system according to claim 9, wherein said second controller determines whether or not said first controller is normal, and when said second controller determines that said first controller is normal, said second controller writes a message to the first shared memory for severing the connection between said first controller and said first upper-level device prior to executing takeover of said access ownership.

11. The storage system according to claim 9, wherein said second controller determines whether or not said first controller is normal, and when said second controller determines that said first controller is not normal, said second controller issues an instruction to said first switching apparatus to sever the connection between said first controller and said first upper-level device prior to executing takeover of said access ownership.

* * * * *